United States Patent
Koishi et al.

[11] Patent Number: 5,850,382
[45] Date of Patent: Dec. 15, 1998

[54] OPTICAL DISK HAVING A REWRITABLE AREA AND A READ-ONLY AREA

[75] Inventors: Kenji Koishi, Sanda; Shunji Ohara, Higashiosaka; Takashi Ishida, Yawata; Isao Satoh, Neyagawa; Yoshinari Takemura, Settsu; Toyoji Gushima, Habikino; Hironori Deguchi, Kadoma; Yoshitaka Mitui, Ibaraki, all of Japan

[73] Assignee: Matsushita Electrical Industrial Co., Ltd., Kadoma, Japan

[21] Appl. No.: 838,675

[22] Filed: Apr. 9, 1997

[30] Foreign Application Priority Data

| Apr. 11, 1996 | [JP] | Japan | 8-089236 |
| Jun. 14, 1996 | [JP] | Japan | 8-153948 |
| Jun. 24, 1996 | [JP] | Japan | 8-162643 |
| Jul. 22, 1997 | [JP] | Japan | 8-191887 |

[51] Int. Cl.⁶ ...................................................... G11B 7/24
[52] U.S. Cl. ...................................... 369/275.3; 369/275.3
[58] Field of Search ............................. 369/275.3, 275.4, 369/58, 44.26, 277, 278, 279, 275.2; 386/126

[56] References Cited

U.S. PATENT DOCUMENTS

| 4,949,330 | 8/1990 | Pasman et al. | 369/118 |
| 5,134,601 | 7/1992 | Greenwell et al. | 369/44.26 |
| 5,327,408 | 7/1994 | Belser | 369/275.3 |
| 5,383,176 | 1/1995 | Inui et al. | 369/275.4 |
| 5,444,682 | 8/1995 | Yamada et al. | 369/32 |
| 5,448,552 | 9/1995 | Onagi | 369/275.4 |
| 5,452,284 | 9/1995 | Miyagawa et al. | 369/275.3 |
| 5,499,229 | 3/1996 | Murakami et al. | 369/111 |
| 5,508,995 | 4/1996 | Moriya et al. | 369/275.4 |
| 5,508,996 | 4/1996 | Endoh | 369/275.3 |
| 5,544,149 | 8/1996 | Katayama et al. | 369/275.3 |
| 5,563,872 | 10/1996 | Horimai | 369/275.3 |
| 5,703,867 | 12/1997 | Miyauchi et al. | 369/275.3 |
| 5,706,268 | 1/1998 | Horimai | 369/275.3 |

FOREIGN PATENT DOCUMENTS

| 63-2170 | 1/1988 | Japan . |
| 1307020 | 12/1989 | Japan . |
| 2289937 | 11/1990 | Japan . |
| 4-26959 | 1/1992 | Japan . |
| 6176404 | 6/1994 | Japan . |
| 6176504 | 6/1994 | Japan . |
| 7-50014 | 2/1995 | Japan . |
| 7211005 | 8/1995 | Japan . |

*Primary Examiner*—Tan Dinh
*Attorney, Agent, or Firm*—Renner, Otto, Boisselle & Sklar, P.L.L.

[57] ABSTRACT

An optical disk is provided which includes a rewritable first recording area and a read-only second recording area. The first recording area includes groove tracks and land tracks divided into first sectors. Each first sector has a header region with identification data and a data region for recording user data. The second recording area includes tracks formed with physical bit rows, the tracks being divided into second sectors. Each second sector includes a header region and a data region having read-only data recorded as the bit rows. The header regions in the first sectors include pits the width of groove tracks and wobbled from a center line of the groove track. The header regions in the second sectors include pits having a width smaller than the groove tracks and formed along the center line of a track.

22 Claims, 23 Drawing Sheets

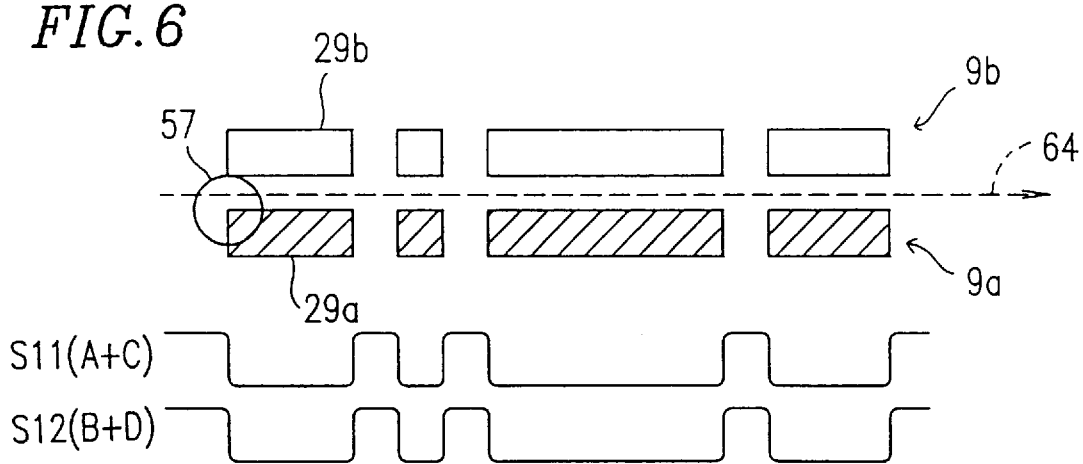
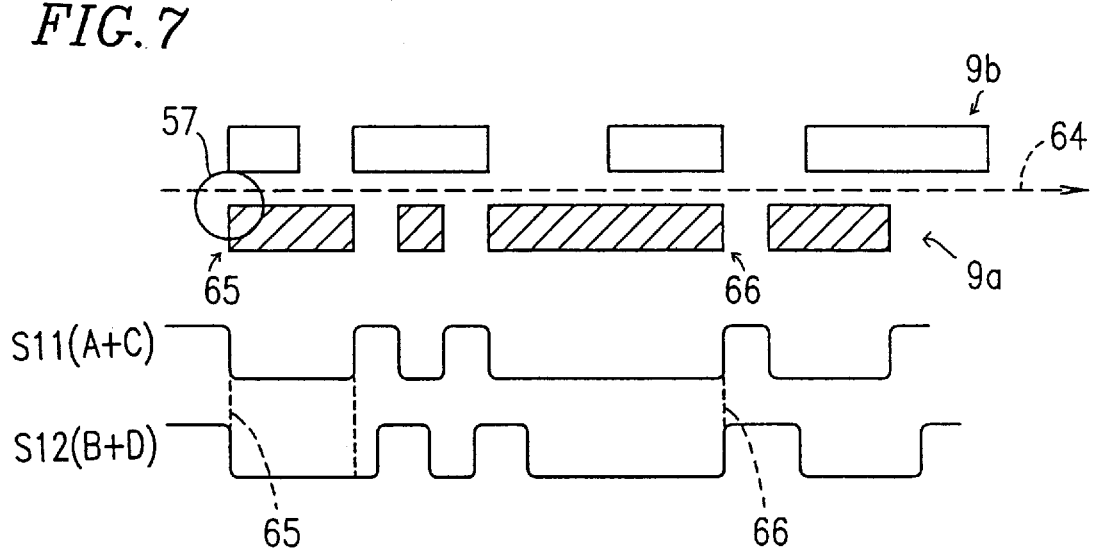

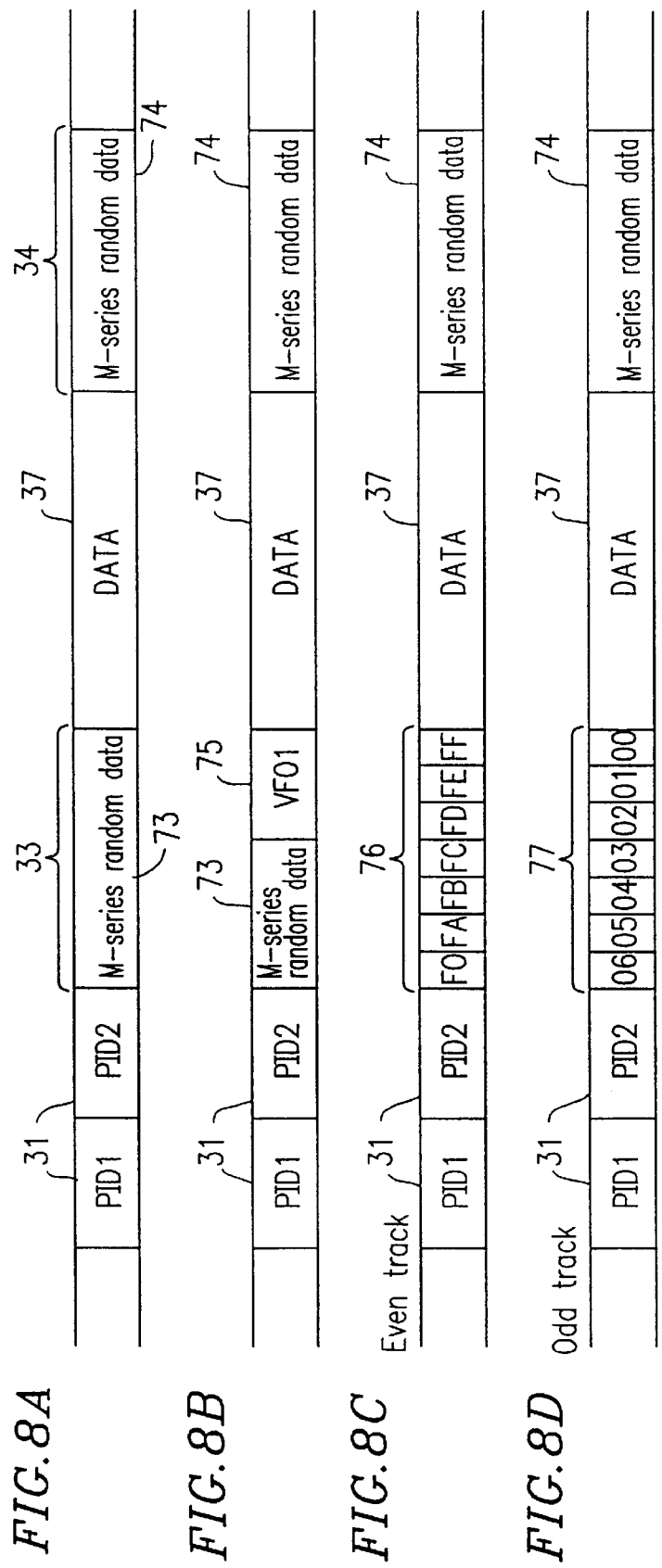

FIG. 13
Conversion table

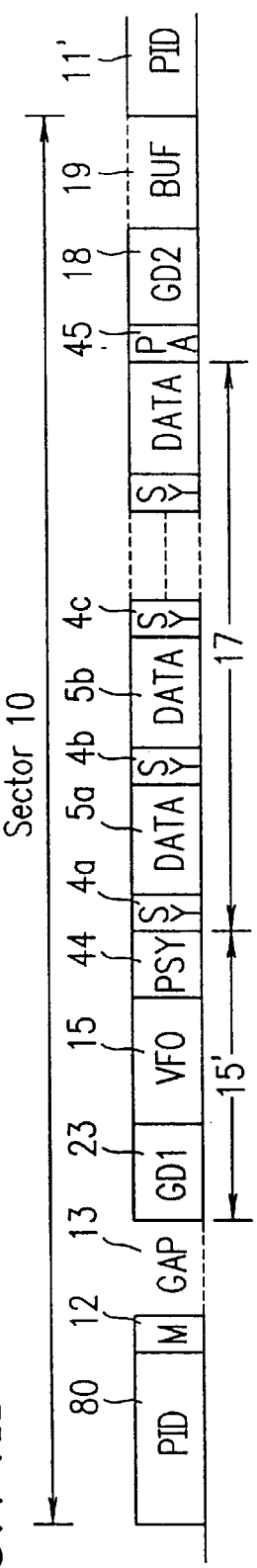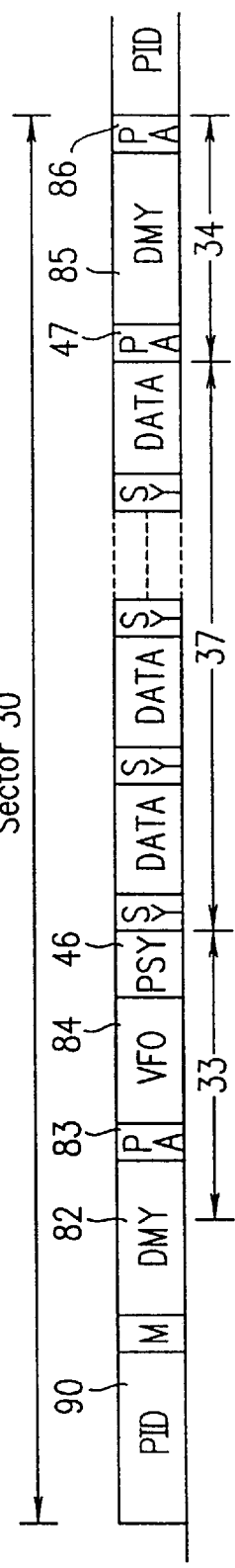
FIG. 14A
FIG. 14B

FIG.15

|  | Pattern1 | Pattern2 | Pattern3 | Pattern4 |
|---|---|---|---|---|
| Average of mark/space lengths | 3.7T | 4.4T | 4.4T | 4.8T |
| Min./max. of mark/space lengths | 3T, 6T | 3T, 6T | 3T, 6T | 3T, 6T |
| Number of 4-bit symbols constituting pattern | 3 | 5 | 5 | 5 |
| \|DSV\| | 6 | 0 | 2 | 0 |

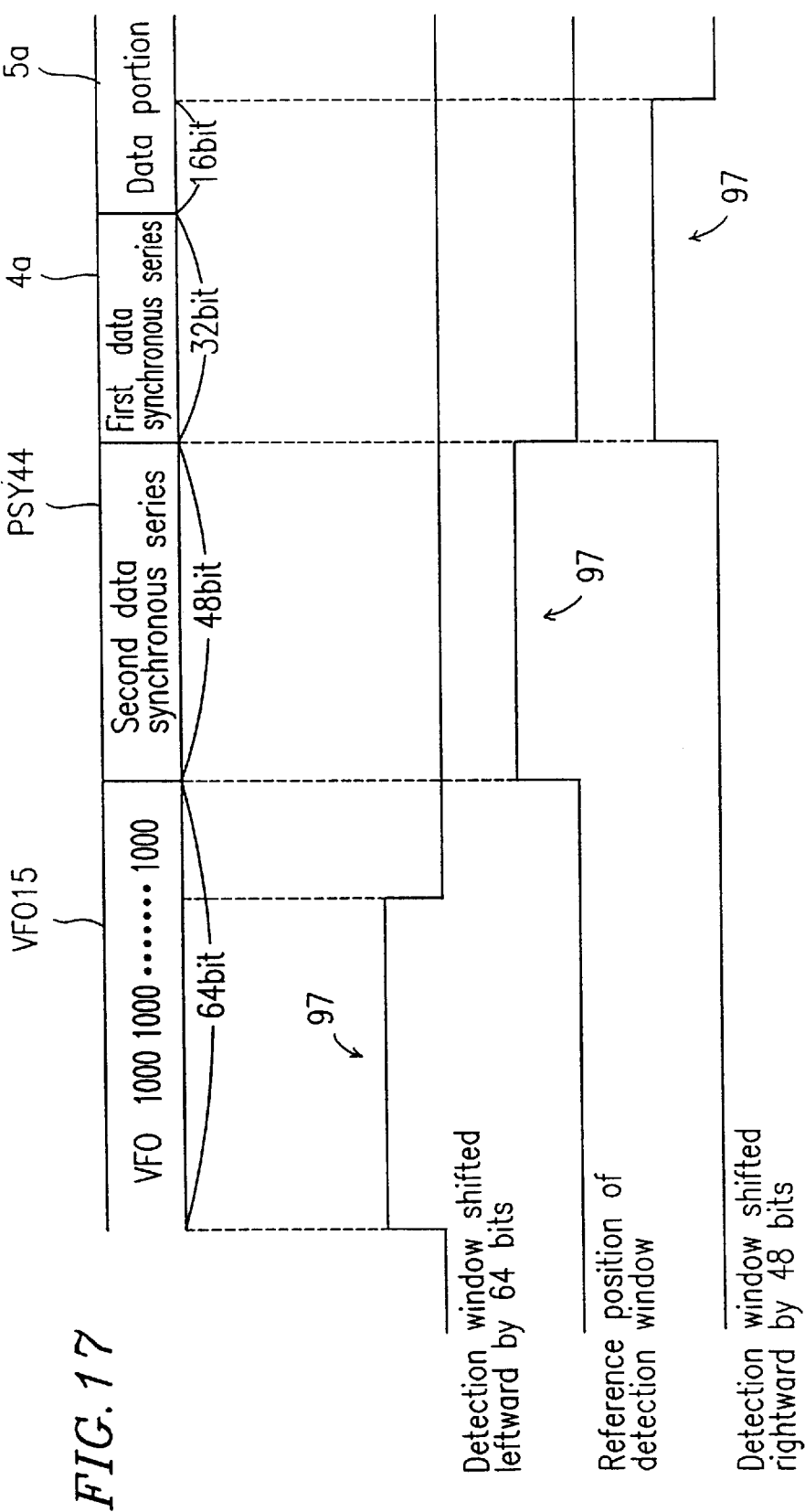

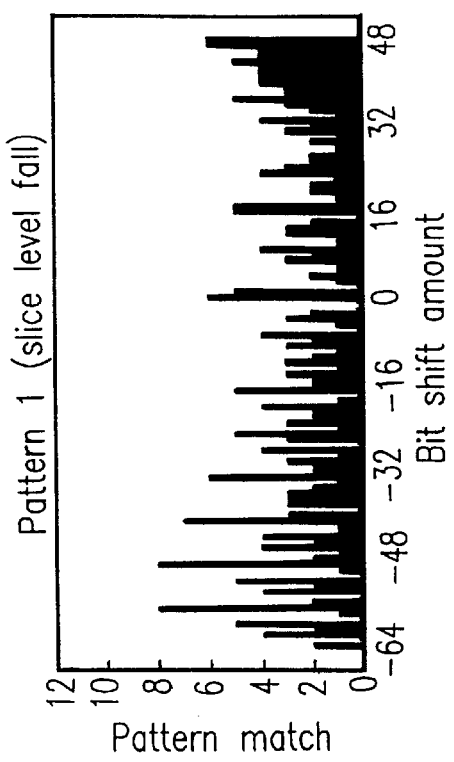
FIG.20D
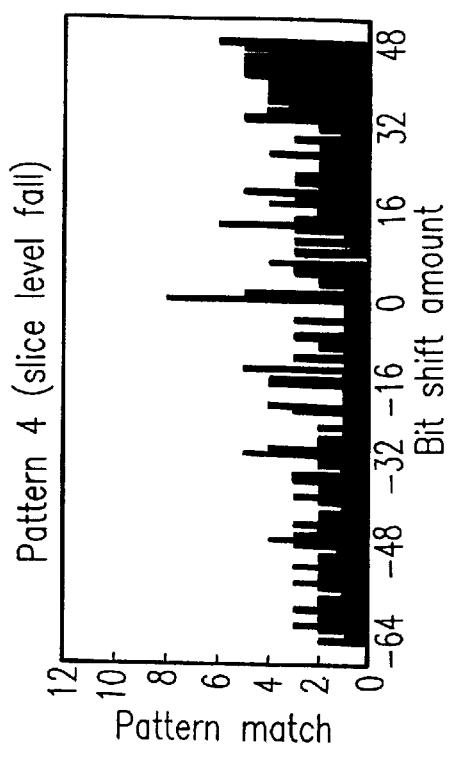
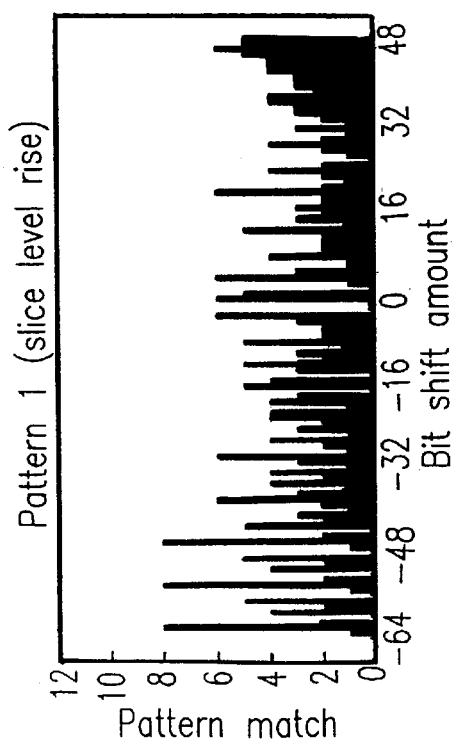
FIG.20C
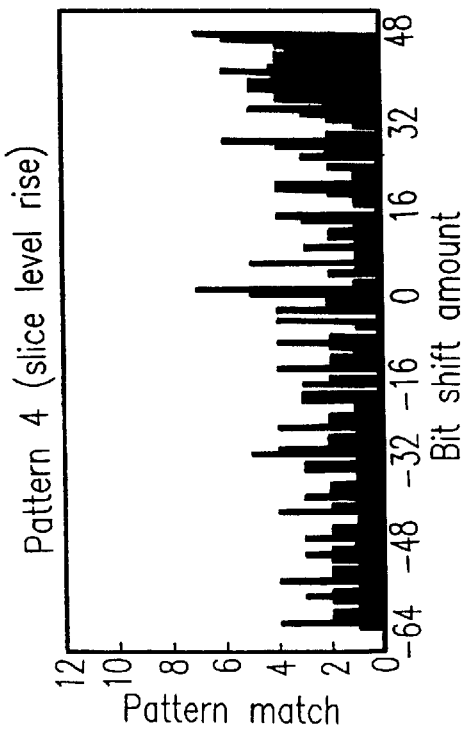

OPTICAL DISK HAVING A REWRITABLE AREA AND A READ-ONLY AREA

BACKGROUND OF THE INVENTION

1. Field of the Invention

The present invention relates to an optical disk. More specifically, the present invention relates to a data format on an optical disk having a rewritable area and a read-only area.

2. Description of the Related Art

Optical disks are classified into a read-only type which only allows for reproduction of recorded data and a rewritable type which allows the user to record data thereon. A read-only optical disk has tracks formed in a spiral or concentric shape on a disk substrate. An array of pits are physically formed along the tracks in accordance with information to be recorded. A rewritable optical disk has grooves formed in a spiral or concentric shape on a disk substrate and a recording layer formed over the grooves. The grooves define tracks. When the user is to record data on the disk, the disk is irradiated with a laser beam along the tracks, and the intensity of the laser beam is modulated in accordance with the data to be recorded so as to form regions with different optical properties (recording marks) on the recording layer.

In an optical disk, generally, one track corresponding to one rotation of the optical disk is divided into a plurality of sectors as units for recording and reproducing data (data units) so as to manage the positions of necessary data on the optical disk and realize high-speed data retrieval.

A read-only optical disk and a rewritable optical disk have different data formats and modulation codes from each other. In order to allow the user to record data every sector, the data format of the rewritable optical disk is required to have, for example, a region for setting the laser power at the head of a recording region of each sector and a region for absorbing a variation of the rotation of a spindle motor at the end of the recording region. In the case of the read-only optical disk where no data is rewritten by the user, information has been recorded on the optical disk at the production of the optical disk with high precision, and no extra region for data recording by the user is required.

FIG. 21 shows a conventional optical disk 301 having a rewritable area and a read-only area. The optical disk 301 has a recording layer formed on a disk substrate so that the user can record and reproduce data on and from the optical disk. Referring to FIG. 21, the optical disk 301 includes read-only areas 302 and 303 located on the outer and inner portions thereof, respectively, and a rewritable area 305 located between the read-only areas 302 and 303.

In the read-only areas 302 and 303, information and data have been previously recorded by forming physical pit arrays 304. In the rewritable area 305, groove-shaped guide tracks 306 have been previously formed so that the user can record and reproduce information and data by tracking the grooves of the tracks (groove tracks) or lands between adjacent grooves (land tracks).

FIG. 22 is a block diagram showing a conventional optical disk recording/reproducing apparatus 300 for recording/reproducing data on/from the optical disk 301 shown in FIG. 21. Referring to FIG. 22, the optical disk recording/reproducing apparatus 300 includes an optical head 307 for recording/reproducing data, a first signal processing section 320 for processing a reproduction signal supplied from the rewritable area 305 of the optical disk 301, a second signal processing section 330 for processing a reproduction signal supplied from the read-only areas 302 and 303 of the optical disk 301, and a switch 308 for connecting the reproduction signal from the optical head 307 to either the first signal processing section 320 or the second signal processing section 330. The first signal processing section 320 includes a first digitizing circuit 309, a first PLL (phase-locked loop) 310, a first timing generator 311, and a first demodulator 312. Likewise, the second signal processing section 330 includes a second digitizing circuit 313, a second PLL 314, a second timing generator 315, and a second demodulator 316.

When data recorded on the rewritable area 305 is to be reproduced, the switch 308 is switched to a terminal A to be connected with the first signal processing section 320. The reproduction signal supplied to the first signal processing section 320 is first converted into a digital signal by the first digitizing circuit 309, and clocked by the first PLL 310. The first timing generator 311 generates a gate signal for reading user data, and the user data is demodulated into binary data by the first demodulator 312. The demodulated data is output from a first output terminal 317.

In a conventional optical disk 301, different data formats and modulation codes are used in the rewritable area 305 and the read-only areas 302 and 303 as described above. Accordingly, the second signal processing section 330 for the read-only areas is separately required. When data recorded on the read-only areas 302 and 303 is to be reproduced, therefore, the switch 308 is switched to a terminal B to be connected with the second signal processing section 330. As in the first signal processing section 320 described above, the reproduction signal supplied to the second signal processing section 330 is first converted into a digital signal by the second digitizing circuit 313, and clocked by the second PLL 314. The second timing generator 315 generates a gate signal for reading user data, and the user data is demodulated into binary data by the second demodulator 316. The demodulated data is output from a second output terminal 318.

FIG. 23 schematically illustrates a data format of a sector 400 on the conventional rewritable optical disk 301.

Referring to FIG. 23, the sector 400 includes a sector identification data region 401 at the head thereof, followed by a gap region 402, a VFO region 403, an information data region 450, and a buffer region 409 in this order. The sector identification data region 401 stores address information and the like for management of the sector. The gap region 402 absorbs signal disturbance at the start of data recording and sets a laser power for recording. The VFO region 403 stores a repetition pattern of codes with a single period to stabilize the clocking at the reproduction. Data stored in the information data region 450 is divided into a plurality of data blocks 405a, 405b, . . . with data synchronous series 404a, 404b, . . . prefixed to the respective data blocks. Each of the data synchronous series 404 (404a, 404b, . . . ) stores a specific code pattern which does not appear in data in the other regions obtained by modulating with a recording code. The buffer region 409 absorbs a variation of the rotation at the end of recording.

Using the data format with the above configuration, the reproduction is conducted in the following manner. First, the clocking at the PLL circuit is stabilized by the repetition pattern stored in the VFO region 403. After the clock has been sufficiently stabilized, the data synchronous series 404a is detected and recognized to be the head of the information data region 450. Upon recognition, the first data block 405a is reproduced. Subsequently, the next data synchronous series 404*b* is detected to reproduce the next data block 405*b*. By repeating this operation, the data on the information data region 450 can be stably reproduced.

With the data synchronous series 404 prefixed to the respective data blocks 405, even if the data reproduction at one data block becomes out of synchronization due to an error such as dropout, the synchronization can be resumed from the next data block, allowing the data reproduction to be continued.

In the conventional optical disk, however, the data formats and modulation codes used in the rewritable area and the read-only area are different from each other as described above. The conventional recording/reproducing apparatus for such an optical disk needs to have two separate signal processing circuits for the rewritable area and the read-only areas, which complicates and enlarges the circuit size of the apparatus.

SUMMARY OF THE INVENTION

The optical disk of this invention has a rewritable first recording area and a read-only second recording area, wherein the first recording area includes first tracks composed of groove tracks consisting of grooves and land tracks consisting of spaces between adjacent grooves, the groove tracks and the land tracks being formed on an optical disk substrate alternately in a spiral or concentric shape, each of the first tracks being divided into a plurality of first sectors, each of the first sectors including a first header region having identification data for identifying the first sector and a first data region for recording user data by forming recording marks by changing optical characteristics of a recording layer. The second recording area includes second tracks formed with physical bit rows arranged on the optical disk substrate in a spiral or concentric shape, each of the second tracks being divided into a plurality of second sectors, each of the second sectors including a second header region having identification data for identifying the second sector and a second data region having read-only data recorded as the bit rows. The first header region includes a physical first pit row, each pit of the first pit row having a width in a radial direction of the optical disk substantially equal to a width of the groove track and being wobbled outward or inward from a center line of the groove track by about a quarter of a pitch of the groove track, and the second header region includes a physical second pit row, each pit of the second pit row having a width in the radial direction of the optical disk smaller than the width of the groove track and being formed substantially along the center line of the second track.

In one embodiment of the invention, a data sequence of the first header region and a data sequence of the second header region are modulated with a same modulation code, and a data sequence of the first data region and a data sequence of the second data region are modulated with a same modulation code.

In another embodiment of the invention, the identification data of the first header region and the identification data of the second header region have data formats with a same data sequence and a same data capacity, and the first data region and the second data region have data formats with a same data sequence and a same data capacity.

In still another embodiment of the invention, a data bit interval between the first header region and the first data region in the first recording area is substantially equal to a data bit interval between the second header region and the second data region in the second recording area.

In still another embodiment of the invention, in the rewritable first recording area, each of the first sectors includes a mirror mark region, a gap region, and a first dummy data region which are formed between the first header region and the first data region and a guard data region and a buffer region which are formed between the first data region and a first header region of a next first sector, and in the second recording area, each of the second sectors including a second dummy data region formed between the second header region and the second data region and a third dummy data region formed between the second data region and a second header region of a next second sector.

In still another embodiment of the invention, each of the first dummy data region, the second dummy data region, and the third dummy data region have a specific sequence pattern of a modulation code used for modulation of data to be recorded.

Alternatively, the optical disk of this invention has a rewritable first recording area and a read-only second recording area, wherein the first recording area includes first tracks composed of groove tracks consisting of grooves and land tracks consisting of spaces between adjacent grooves, the groove tracks and the land tracks being formed on an optical disk substrate alternately in a spiral or concentric shape. Each of the first tracks is divided into a plurality of first sectors. Each of the first sectors including a first header region having identification data for identifying the first sector and a first data region for recording user data as recording marks by changing optical characteristics of a recording layer. The second recording area includes second tracks formed with physical bit rows arranged on the optical disk substrate in a spiral or concentric shape. Each of the second tracks being divided into a plurality of second sectors, each of the second sectors including a second header region having identification data for identifying the second sector and a second data region having read-only data recorded as the bit rows. Data series of the first and second recording areas are modulated with a same modulation code, the first and second sectors have a same data capacity, the first and second header regions have a same data sequence, and the first and second data regions have a same data sequence and a same data capacity.

In one embodiment of the invention, each of the first sectors includes a first dummy data region formed between the first header region and the first data region. Each of the second sectors includes a second dummy data region formed between the second header region and the second data region and a third dummy data region formed between the second data region and a second header region of a next second sector. Each of the second and third dummy data regions includes, in at least a portion thereof, data of a data series different from a data series of a corresponding dummy data region on an inward or outward adjacent track on the optical disk substrate.

In another embodiment of the invention, each of the second and third dummy data regions includes, in at least a portion thereof, a random data series with substantially no correlation with a data series provided on a corresponding dummy data region on an adjacent track.

In still another embodiment of the invention, the random data series is a data series generated by an M-series sequence.

In still another embodiment of the invention, each of the second and third dummy data regions includes, in at least a portion thereof, a random data series with substantially no correlation with a data series formed on a corresponding dummy data region on an adjacent track and a specific sequence pattern included in a modulation code provided following the random data series.

In still another embodiment of the invention, each of the second and third dummy data regions includes, in at least a portion thereof, a data synchronous series for specifying a start timing position of the second data region.

In still another embodiment of the invention, the data synchronous series included in the second and third dummy data regions are provided so that a pattern of the data synchronous series is switched every track among a plurality of different data synchronous patterns.

In still another embodiment of the invention, each of the second and third dummy data regions has, in at least a portion thereof, a pattern generated by scrambling a predetermined data based on address information in the sector identification data and by modulating the scrambled data with the modulation code.

In still another embodiment of the invention, one error correction block includes a predetermined number k (k is an integer) of the first or second sectors, and data is recorded on the number of sectors equal to a multiple of k, dummy data being recorded on remaining sectors of less than k.

Alternatively, the optical disk of this invention has a rewritable first recording area and a read-only second recording area, wherein the first recording area includes first tracks composed of groove tracks consisting of grooves and land tracks consisting of spaces between adjacent grooves, the groove tracks and the land tracks being formed on an optical disk substrate alternately in a spiral or concentric shape. Each of the first tracks is divided into a plurality of first sectors. Each of the first sectors including a first header region having identification data for identifying the first sector and a first data region for recording user data by forming recording marks obtained by changing optical characteristics of a recording layer. The second recording area includes second tracks formed with physical bit rows arranged on the optical disk substrate in a spiral or concentric shape. Each of the second tracks is divided into a plurality of second sectors, each of the second sectors including a second header region having identification data for identifying the second sector and a second data region having read-only data recorded as the bit rows. At least one of the first and second data regions includes: a first data synchronous series provided at a head of the data region for specifying a start timing position of the data region; a second data synchronous series preceding the first data synchronous series for specifying a start timing position of the data region; and a third data synchronous series preceding the second data synchronous series and having a specific repetition sequence pattern of a modulation code in the data region.

In one embodiment of the invention, the data region is divided into a plurality of data blocks, the first data synchronous series is provided at a head of each of the data blocks, and the second data synchronous series precedes the first data synchronous series provided at a head of a first one of the plurality of data blocks.

In another embodiment of the invention, a digital sum value which is obtained by converting "1" and "0" in the second data synchronous series into "1" and "−1", respectively, and by summing all values is substantially zero.

In still another embodiment of the invention, the second data synchronous series satisfies a maximum length and a minimum length as limit values under a modulation code rule of a mark length ("1" or "0" level) and a space length ("0" or "1" level) of the data region.

In still another embodiment of the invention, an average of the mark length and the space length of the second data synchronous series is larger than the mark length and the space length of the third data synchronous series.

In still another embodiment of the invention, the second data synchronous series is a data series composed of a combination of a plurality of any of 4-bit code symbols, "0100", "0010", "1000", "0000".

In still another embodiment of the invention, the second data synchronous series is a data series including a code series, "0000 0100 0100 1000 0010 0001 0010 0000 1000 0010 0001 0000".

Thus, the invention described herein makes possible the advantage of providing an optical disk having a rewritable area and a read-only area which can reduce the circuit size of a recording/reproducing apparatus using the optical disk and provide stable reproduction.

These and other advantages of the present invention will become apparent to those skilled in the art upon reading and understanding the following detailed description with reference to the accompanying figures.

BRIEF DESCRIPTION OF THE DRAWINGS

FIG. 6 illustrates waveforms of tracking error signals obtained when same data series are recorded on adjacent tracks.

FIG. 7 illustrates waveforms of tracking error signals obtained when different data series are recorded on adjacent tracks.

FIGS. 8A to 8D illustrate data formats of dummy data regions according to the present invention.

FIG. 13 is an example of a conversion table of modulation codes.

FIGS. 14A and 14B illustrate data formats in the rewritable area and the read-only areas of an optical disk according to the present invention.

FIG. 15 is a table illustrating the comparison of the properties of patterns of a second data synchronous series according to the present invention.

FIG. 17 illustrates a detection method and a detection range for the second data synchronous series.

FIGS. 20C and 20D are graphs illustrating autocorrelation functions of patterns 1 and 4 obtained when the slice level is shifted.

DESCRIPTION OF THE PREFERRED EMBODIMENTS

The present invention will be described by way of examples with reference to the accompanying drawings.

EXAMPLE 1

An optical disk of Example 1 according to the present invention has a recording layer formed on a disk substrate so as to allow the user to record and reproduce data on and from the optical disk.

Figure 1:
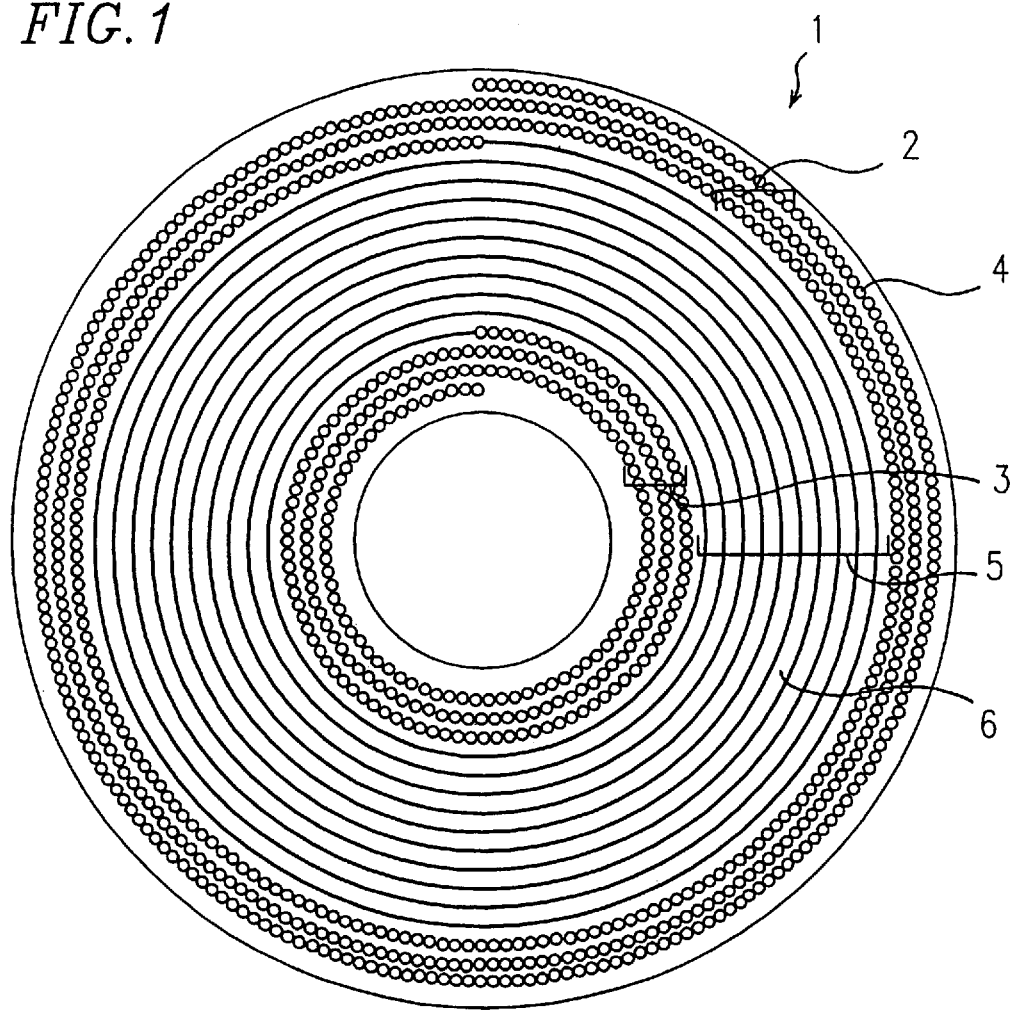
FIG. 1 illustrates an optical disk having a rewritable area and read-only areas according to the present invention.

Referring to FIG. 1, an optical disk 1 of Example 1 includes read-only areas 2 and 3 located on the outer and inner portions thereof, respectively, and a rewritable area 5 located between the read-only areas 2 and 3.

In the read-only areas 2 and 3, pit rows are physically formed as tracks. The length and position of each pit in the pit rows have been determined in accordance with read-only data recorded on the read-only areas 2 and 3. In the rewritable area 5, guide grooves (guide tracks) 6 are formed in a spiral or concentric shape on the disk substrate. Information and data are recorded along the grooves (groove tracks) or lands between adjacent grooves (land tracks). Hereinbelow, the groove tracks and the land tracks are collectively referred to as information tracks. In FIG. 1, the optical disk 1 is shown to have spiral tracks on either area.

Each of the information tracks in the rewritable area 5 is divided into a plurality of sectors. Each sector includes a first header region having identification data for identifying the sector and a first data region for storing user data by forming recording marks by changing the optical properties of the recording layer. Likewise, each track in the read-only areas 2 and 3 is divided into a plurality of sectors. Each sector of the read-only areas 2 and 3 includes a second header region having identification data for identifying the sector and a second data region having read-only data recorded thereon in the form of the pit rows. In this way, by dividing each track corresponding to one rotation of the optical disk into a plurality of sectors (data units), management of the positions of necessary data on the optical disk and high-speed data retrieval can be realized.

Figure 2:
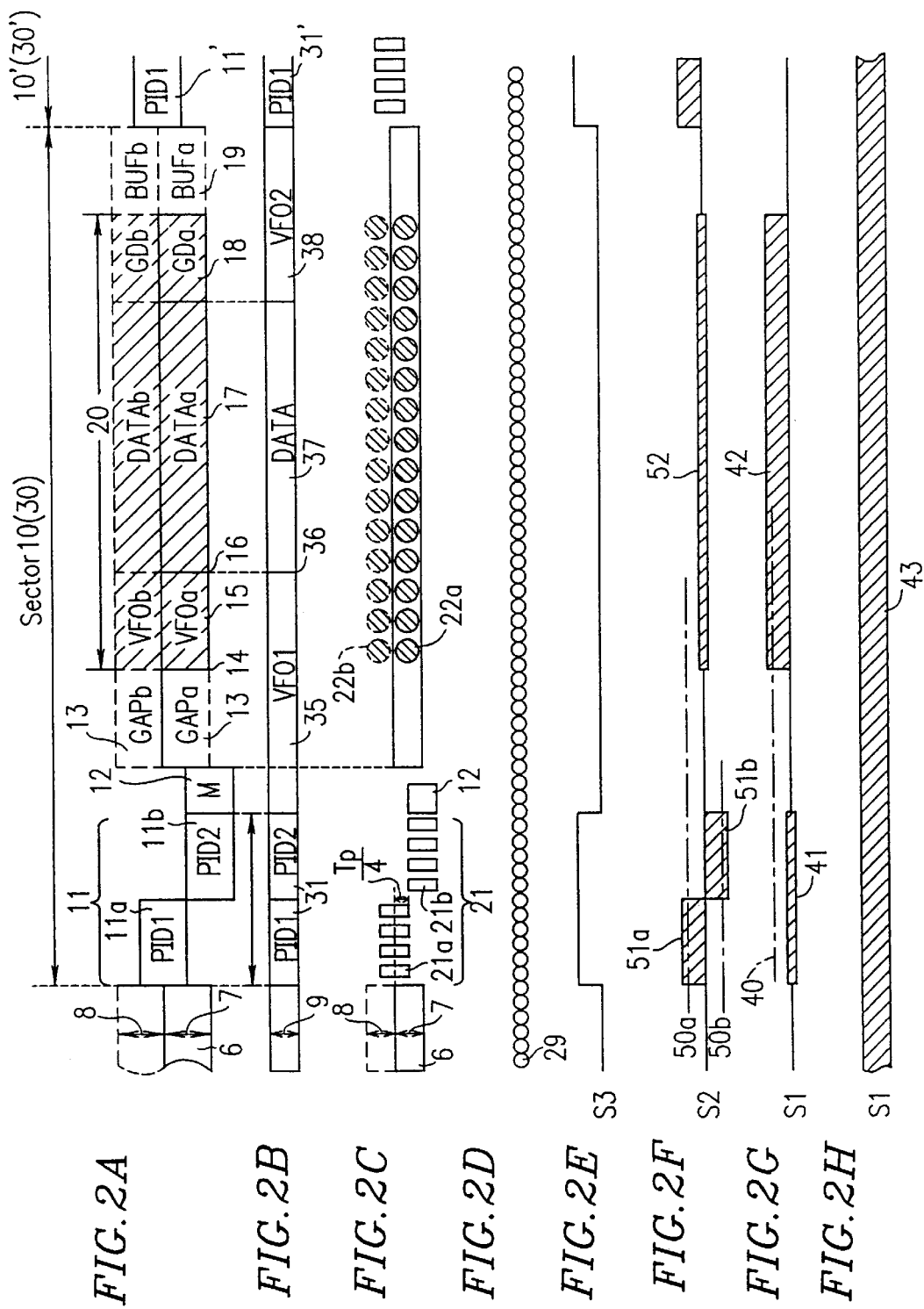
FIGS. 2A to 2H illustrate data formats and reproduction signals used in the optical disk according to the present invention.

FIGS. 2A to 2H shows data formats of the optical disk 1 of this example. A data format in the rewritable area 5 will be first described. FIG. 2A shows an exemplified data format of each sector 10 in the rewritable area 5, and FIG. 2C shows a physical configuration of the information track corresponding to the sector 10 of FIG. 2A. FIG. 2A shows data formats of two adjacent information tracks, i.e., a groove track 7 corresponding to the guide track 6 and a land track 8 adjacent to the groove track 7, for comparison with the physical configurations thereof shown in FIG. 2C. Such a groove track 7 and land track 8 alternately appear in the rewritable area 5 of the optical disk 1. The user can record desired information (user data) on both the groove track 7 and the land track 8 by tracking the groove track 7 and the land track 8 separately.

Referring to FIG. 2A, the sector 10 includes a first header region 11 (sector identification data PID1 and PID2) and an information region 20. A mirror mark region 12 (M) and a gap region 13 (GAPa and GAPb) are formed between the first header region 11 and the information region 20. The information region 20 includes a first dummy data region 15 (VFO region (VFOa and VFOb)), a first data region 17 (DATAa and DATAb), and a guard data region 18 (GDa and GDb) as will be described later in detail. A buffer region 19 (BUFa and BUFb) is formed between the information region 20 and a first header region 11' of a next sector 10'. The affix a of the above abbreviated codes (e.g., VFOa and DATAa) indicates that the regions are formed on the groove track 7, while the affix b (e.g., VFOb and DATAb) indicates that the regions are formed on the land track 8. This is also applicable in the following description unless otherwise specified.

Referring to FIG. 2C, the first header region 11 includes a physically formed pit row 21 (21a and 21b). The width of each pit of the pit row 21 in the radial direction of the optical disk 1 is substantially equal to the width of the guide groove 6 (groove track 7). The pit rows 21a and 21b are displaced outward and inward from the center line of the guide groove 6 (i.e., wobbled) by about a quarter of the pitch of the guide groove 6 (i.e., groove pitch Tp). In this example, the first header region 11 is divided into a former half 11a and a latter half 11b. The pit row 21a corresponding to the former half 11a is displaced outward to the periphery of the optical disk 1, while the pit row 21b corresponding to the latter half 11b is displaced inward.

With this displacement of the pit rows 21a and 21b from the center line of the guide groove 6 (groove track 7), the first header region 11 can be commonly used for servo tracking of both the groove track 7 and the land track 8. Thus, separate exclusive header regions for the groove track 7 and the land track 8 are not required.

If exclusive header regions are required for the groove track 7 and the land track 8, a width of the pit rows should be smaller than the width of the guide groove 6 so that the respective pit rows on the groove track 7 and the land track 8 do not overlap each other. Such a narrow pit may be formed by using a light beam different from a light beam for cutting the guide groove 6. It is difficult, however, to keep stable the positional precision between the two beams.

In this example, a light beam for cutting the guide groove 6 is wobbled rightward and leftward from the center line of the guide groove 6 (groove track 7) using an AO modulator and the like to form the pit row 21 of the first header region 11. Thus, the pit row 21 can be formed on the optical disk 1 easily with high precision without using another beam for cutting.

The mirror mark region 12 following the header region 11 is used to determine whether the groove track 7 or the land track 8 is being tracked.

The gap region 13 (13a and 13b) is formed on the groove track 7 and the land track 8 to avoid a head 14 of the information region 20 from overlapping the mirror mark region 12 or the first header region 11 when a jitter occurs due to the rotation of the optical disk 1.

User data is recorded on the information region 20, which includes the first dummy data region 15 (VFOa and VFOb), the first data region 17 (DATAa and DATAb), and the guard data region 18 (GDa and GDb) as described above (see FIG. 2A). Information is recorded on the information region 20 by irradiating the recording layer formed on the optical disk 1 with a laser beam to change the optical properties (reflectance) of the recording layer. For example, an irradiated portion of the recording layer may be changed from a crystalline state to an amorphous state so as to form a recording mark with a reflectance different from the other portions. As shown in FIG. 2C, a recording mark array 22a is formed on the groove track 7, while a recording mark array 22b is formed on the land track 8.

The first dummy data region 15 is a VFO region where a specific pattern is recorded so as to promptly stabilize clock the PLL of the reproduction signal processing circuit. More specifically, a specific pattern (a specific bit length) of modulation codes used for data modulation is sequentially recorded on the dummy data region 15. Desired user data including an error correction code is recorded on the first data region 17. The guard data region 18 is formed at the end of the first data region 17 to ensure the stability of the reproduction signal processing circuit.

The buffer region 19 includes no data but is formed to avoid the end of the information region 20 from overlapping the header region 11' of the next sector 10' when a jitter occurs due to the rotation of the optical disk 1.

Thus, in the rewritable area 5, data is recorded on the groove track 7 and the land track 8 in accordance with the data formats described above.

Then, a data format in the read-only areas 2 and 3 will be described with reference to FIGS. 2B and 2D. FIG. 2B shows an exemplified data format of each sector 30 of the read-only areas 2 and 3, and FIG. 2D schematically illustrates a physical configuration of the track corresponding to the sector 30 of FIG. 2B.

In the read-only areas 2 and 3, a track 9 is composed of a pre-recorded pit row 29 (a pre-pit row). As shown in FIG. 2D, the pit rows are formed in accordance with the same physical format over the entire data region in the read-only areas 2 and 3. More specifically, the width of the pit row 29 in the radial direction of the optical disk 1 is smaller than the width (groove width) of the guide groove 6 (groove track 7) formed in the rewritable area 5, and all the pits are lined substantially along the center line of the track.

Like the rewritable area 5, each track in the read-only areas 2 and 3 is divided into a plurality of sectors 30 for data recording so as to manage the positions of necessary information data on the optical disk and realize high-speed data retrieval. It will be preferable for practical information recording/reproduction if the sectors in the read-only areas 2 and 3 and the rewritable area 5 can be managed in a same manner and the processing such as sector retrieval are unified. To realize this unified processing, in this example, the length of each sector and the lengths of the header region and the data region of each sector in the read-only area 2 and 3 are made equal to those in the rewritable area 5 to match the data format in the read-only area with that in the rewritable area.

A specific data format in the read-only areas 2 and 3 will be described as an example. Referring to FIG. 2B, the sector 30 includes a second header region 31 (sector identification data PID1 and PID2) and a second data region 37. A second dummy data region 35 (VFO1) is formed between the second header region 31 and the second data region 37. A third dummy data region 38 (VFO2) is formed between the second data region 37 and a second header region 13' of a next sector 30'.

Referring to FIG. 2D, the pit row 29 of the second header region 31 is lined substantially along the center line of the track 9, not displaced outward or inward as in the first header region 11 in the rewritable area 5. The width of the pit row 29 in the read-only areas 2 or 3 in the radial direction of the optical disk 1 is smaller than the groove width unlike the width of the pit row 21 in the rewritable area 5 which is substantially equal to the groove width.

In the second data region 37, also, the pit row has been previously formed substantially along the center line of the track 9 on the optical disk 1 in accordance with the data for recording.

As is observed from FIGS. 2A and 2B, the first header region 11 in the rewritable area 5 and the second header region 21 in the read-only areas 2 and 3 are the same in the data capacity, the data format (signal sequence), and the modulation codes. Also, the first data region 17 in the rewritable area 5 and the second data region 37 in the read-only areas 2 and 3 are the same in the data capacity, the data format (signal sequence), and the modulation codes.

Further, as shown in FIGS. 2A and 2B, a head (start timing) 16 of the first data region 17 in the rewritable area 5 and a head (start timing) 36 in the second data region 37 in the read-only areas 2 and 3 are matched with each other.

Thus, by using the same formats (signal sequences) for the first and second header regions 11 and 31 and for the first and second data regions 17 and 37 in the rewritable area 5 and the read-only areas 2 and 3, one reproduction signal processing circuit can be shared by both the rewritable area 5 and the read-only areas 2 and 3, and thus the circuit size can be reduced.

The second dummy data region 35 is formed to prevent the servo tracking from becoming unstable due to discontinuation of tracking error signals which may occur if no pit row is formed between the second header region 31 and the second data region 37. The second dummy data region 35 includes, for example, a specific data pattern of the same modulation code as that used for the first dummy data region (VFO region) 15 in the rewritable area 5. With this arrangement, it is possible to promptly and stably clock the PLL of the reproduction signal processing circuit. Random data or any other data may also be used to stabilize the servo tracking.

The third dummy data region 38 is formed to prevent the servo tracking from becoming unstable due to discontinuation of tracking error signals, as in the second dummy data region 35.

As described above, in the read-only areas 2 and 3, the pit rows both in the second header region 31 and the second data region 37 are lined substantially along the center line of the track 9. Further, the second and third dummy data regions 35 and 38 fill the space between the second header region 31 of the sector 30 and the second data region 37 of the sector 30 and the space between the second data region 37 of the sector 30 and the second header region 31' of the next sector 30'. As a result, the physical arrangement of the pit row 29 is uniform along the track 9 over the entire read-only areas 2 and 3.

Thus according to the data format of the optical disk 1 of Example 1, the first header region 11 is commonly used for the tracking of both of the groove track 7 and the land track 8. Thus, separate exclusive header regions for the groove track 7 and the land track 8 are not required.

Since the first header region 11 can be easily and precisely formed on the optical disk by wobbling a light beam for cutting the guide groove 6 (groove track 7) rightward and leftward from the track center, a separate exclusive light source for forming the first header region is not required. Thus, the preformat in the rewritable area 5 of the optical disk 1 of this example can be easily formed by use of a single light source for cutting, reducing the circuit size of the recording/reproducing apparatus for this optical disk.

Figure 3:
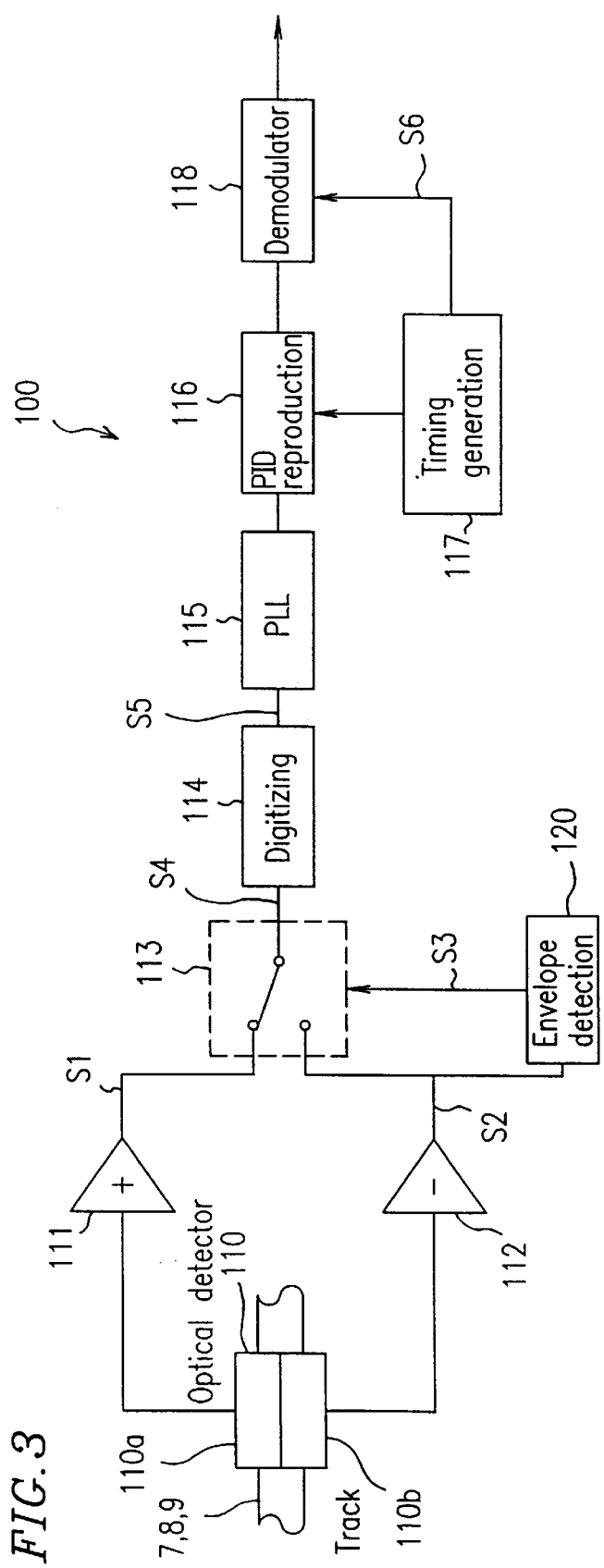
FIG. 3 is a block diagram illustrating a reproduction signal processing section for reproducing data from the optical disk according to the present invention.

FIG. 3 is a block diagram schematically showing a reproduction signal processing section of an optical disk recording/reproducing apparatus 100 for recording/reproducing data on/from the optical disk 1 of this example. Referring to FIG. 3, the reproduction signal processing section of the optical disk recording/reproducing apparatus 100 includes a 2-part optical detector 110, a summing amplifier 111, a differential amplifier 112, a switch circuit 113, a digitizing circuit 114, a PLL (phase-locked loop) 115, a PID reproduction circuit 116, a timing generator 117, a demodulator 118, and an envelope detector 120.

The 2-part optical detector 110 (parts 110a and 110b) which is disposed in an optical head (not shown) receives reflected light from the groove track 7 and the land track 8 (the recording mark arrays 22 and the pit rows 21) in the rewritable area 5 of the optical disk 1 and reflected light from the track 9 (the pit row 29) in the read-only areas 2 and 3, and converts the reflected light into a reproduction signal.

The summing amplifier 111 generates a sum signal S1 indicating the sum of two detection signals obtained from the two parts 110a and 110b of the 2-part optical detector 110 to supply to the switch circuit 113. The differential amplifier 112 generates a difference signal S2 representing the difference between the two detection signals to supply to the envelope detector 120.

The switch circuit 113 switches between the sum signal S1 and the difference signal S2 to supply either signal to the digitizing circuit 114. The envelope detector 120 detects an envelope in the difference signal S2. When an amplitude exceeding a predetermined threshold is observed in the difference signal S2, a control signal S3 is supplied to the switch circuit 113 to force the switch circuit 113 to switch to output the difference signal S2 as an output signal S4.

In the case of using the data formats shown in FIGS. 2A to 2D, the difference signal S2 is obtained only when the reproduction signal is obtained from the first header region 11 in the rewritable area 5, as will be described later in detail. Accordingly, as shown in FIG. 2E, the control signal S3 output from the envelope detector 120 becomes high only when the first header region 11 in the rewritable area 5 is detected. The output signal S4 from the switch circuit 113 is therefore equal to the difference signal S2 only when the first header region 11 is detected. Otherwise, the output signal S4 is equal to the sum signal S1. That is, the sum signal S1 is output from the switch circuit 113 as the output signal S4 when the reproduction signal is obtained from the information region 20 in the rewritable area 5 and the entire read-only areas 2 and 3.

The output signal S4 from the switch circuit 113 (the sum signal S1 or the difference signal S2) is supplied to the digitizing circuit 114. The digitizing circuit 114 digitizes the output signal S4 into a binary signal in accordance with a threshold set for each of the sum signal S1 and the difference signal S2, for example, and outputs a digital signal S5 to the PLL 115.

The PLL 115 extracts a reproduction clock from the digital signal S5 and outputs the reproduction clock to the PID reproduction circuit 116 which reproduces a sector identification signal from the header region. The timing generator 117 determines the start timing (the heads 16 and 36 of the data regions shown in FIGS. 2A and 2B) for reading the user data recorded on the data regions 17 and 37 based on the sector identification signal from the PID reproduction circuit 116, to initiate the demodulator 118 by supplying a control signal S6. The demodulator 118 demodulates the user data and outputs the results.

Hereinbelow, the waveforms of the signals obtained when recorded data on the information track in the rewritable area 5 (i.e., user data already recorded on the information region 20) is reproduced until it is converted into a binary signal will be described. FIG. 2G is an output waveform of the sum signal S1 obtained from the rewritable area 5, and FIG. 2F is an output waveform of the difference signal S2.

As shown in FIG. 2G, the portion of the sum signal S1 corresponding to the first header region 11 in the rewritable area 5 is not detected by the digitizing circuit 114 because an amplitude 41 thereof is smaller than a predetermined threshold 40 for digitizing. The reason why the amplitude 41 is small is that the pit row of the first header region 11 is slightly displaced outward (the former half 11a) or inward (the latter half 11b) from the center line of the groove track. This causes a light beam from the optical head to be diffracted by the pit rows 21a and 21b and thus reduces the light amount received by the optical detector 110.

On the contrary, an amplitude 42 of the sum signal S1 corresponding to the information region 20 in the rewritable area 5 exceeds the threshold 40 for digitizing because the recording mark array 22 is formed along the center line of the information track. The sum signal S1 is therefore detected by the digitizing circuit 114, and the reproduction signal is obtained.

FIG. 2F shows an output of the difference signal S2 obtained from the rewritable area 5. Since the pit row 21a in the former half 11a of the first header region 11 is displaced outward, a larger amount of reflected light from the pit row 21a is diffracted to the outward part 110a of the 2-part optical detector 110. Accordingly, the difference signal S2 output from the 2-part optical detector 110 has an amplitude 51a which exceeds a positive threshold 50a for digitizing as shown in FIG. 2F. The difference signal S2 is therefore detected by the digitizing circuit 114, and the reproduction signal is obtained.

Likewise, since the pit row 21b in the latter half 11b of the first header region 11 is displaced inward, a larger amount of reflected light from the pit row 21b is diffracted to the inward part 110b of the 2-part optical detector 110. Accordingly, the difference signal S2 output from the 2-part optical detector 110 has an amplitude 51b which exceeds a negative threshold 50b for digitizing as shown in FIG. 2F. The difference signal S2 is therefore detected by the digitizing circuit 114, and the reproduction signal is obtained.

On the contrary, in the information region 20 in the rewritable area 5, since the recording mark array 22 is formed along the center line of the information track, the light amounts received by the outward and inward parts 110a and 110b of the 2-part optical detector 110 are substantially the same. Therefore, an amplitude 52 of the difference signal S2 is too small to reach the threshold 51a (51b) for digitizing as shown in FIG. 2F. Likewise, in the read-only areas 2 and 3, since the pit row 29 is formed along the center line of the track 9, the light amounts received by the outward and inward parts 110a and 110b of the 2-part optical detector 110 are substantially the same. The difference signal S2 is substantially not output. Therefore, in the regions other than the first header region 11, the difference signal S2 is not detected by the binary detector 114, and thus no reproduction signal is obtained.

FIG. 2H shows an output waveform of the sum signal S1 obtained from the read-only areas 2 and 3. Referring to FIG. 2H, since the pit row 29 is formed along the center line of the track 9 for servo tracking in the read-only areas 2 and 3, the sum signal S1 has an amplitude 43 sufficiently large to be detected by the binary detector 114. Therefore, signals from all the regions in the reproduction-only areas 2 and 3 including the second header region 31 and the second data region 37 can be converted into binary signals by use of the sum signal S1. It is not necessary, therefore, to switch the switch circuit 113 for the read-only areas 2 and 3.

Thus, in the optical disk recording/reproducing apparatus 100 for reproducing information from the optical disk 1 with the above-described data formats, unlike the conventional apparatus, separate reproduction signal processing circuits for the rewritable area and the reproduction-only area are not required, but a common signal processing section can be used. This reduces the circuit size of the optical disk recording/reproducing apparatus, and realizes a reproduction signal processing circuit with a simpler configuration and higher reliability.

EXAMPLE 2

FIGS. 4A to 4H show data formats of an optical disk of Example 2 according to the present invention. The basic configuration of the optical disk of this example is the same as that of the optical disk 1 of Example 1. The same components as those of the optical disk 1 are denoted by the same reference numerals, and the description thereof is omitted here. In this example, as in Example 1, one track corresponding to one rotation of the-optical disk is divided into a plurality of sectors. Each sector starts with a header region including sector identification data representing address information of the sector. In this example, the data format in the read-only area will mainly be described.

Figure 4:
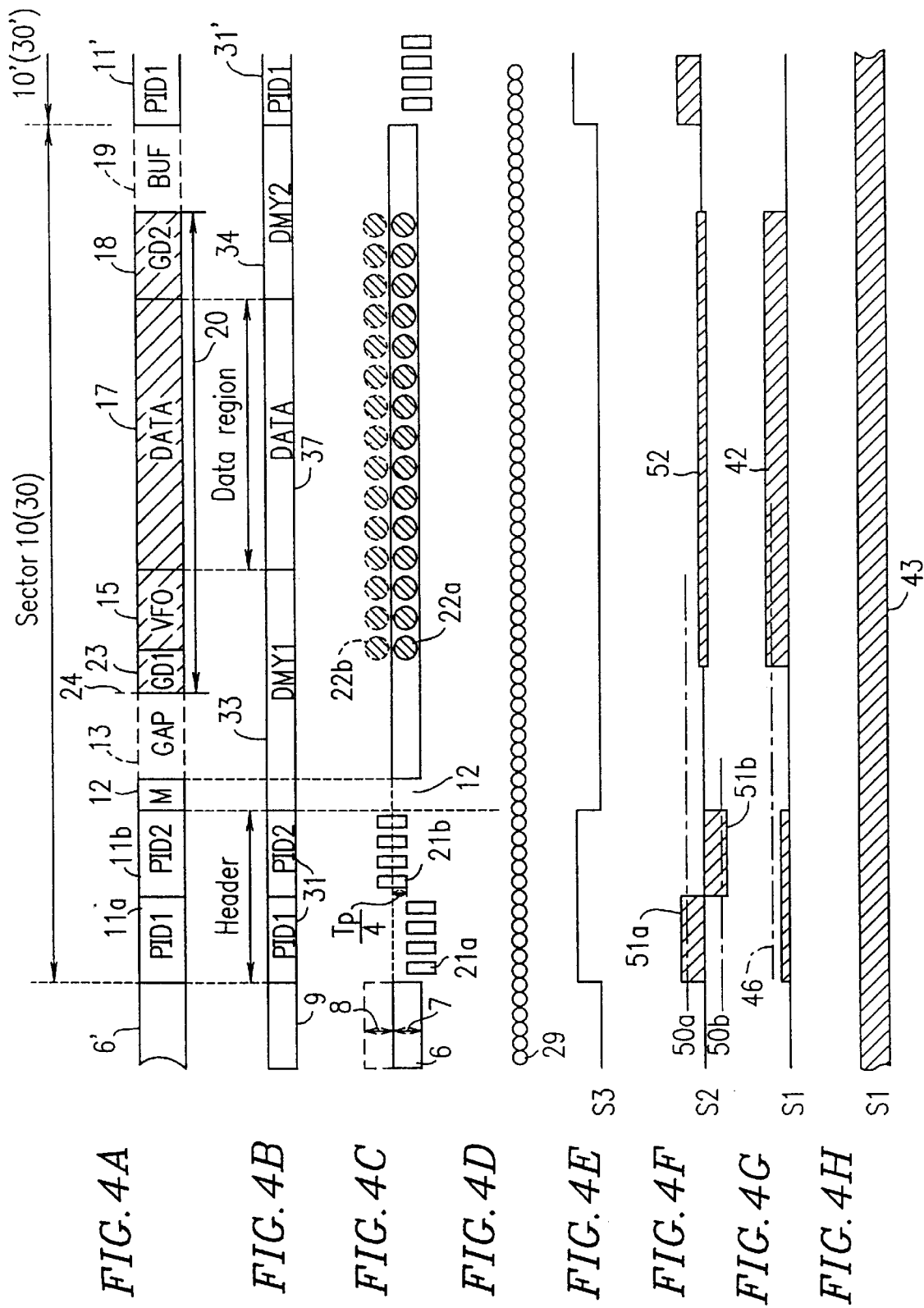
FIGS. 4A to 4H illustrate data formats and reproduction signals used in another optical disk according to the present invention.

FIG. 4A is an exemplified data format of each sector 10 in the rewritable area 5, and FIG. 4C shows a physical configuration of the information track corresponding to the sector 10 of FIG. 4A. As shown in FIG. 4C, the groove guide track 6 constitutes the groove track 7 and a land between adjacent grooves constitutes the land track 8. Such groove tracks 7 and land tracks 8 alternately appear in the rewritable area 5 of the optical disk 1. The user can record desired information (user data) on both the groove track 7 and the land track 8 by tracking the groove track 7 and the land track 8 separately.

In this example, as shown in FIG. 4A, the groove track 7 and the land track 8 are described collectively as an information track 6'. The sector 10 in the rewritable area 5 includes the first header region 11 at the head thereof. The first header region 11 is divided into the former half 11a (sector identification data PID1) and the latter half 11b (sector identification data PID2). As shown in FIG. 4C, the physical pit rows 21a and 21b are formed in correspondence with the former half 11a and the latter half 11b, respectively.

As shown in FIG. 4C, the width of each pit of the pit rows 21a and 21b in the radial direction of the optical disk 1 is substantially equal to the width of the guide groove 6 (groove track 7). The pit rows 21a and 21b are displaced outward or inward (i.e., in the opposite directions) from the center line of the guide groove 6, i.e., wobbled, by about a quarter of the pitch of the guide groove 6 (groove pitch Tp).

In this example, the pit row 21a is displaced inward, while the pit row 21b is displaced outward.

Thus, by displacing the pit rows 21a and 21b from the center line of the guide groove 6 (the groove track 7), the first header region 11 is commonly used to track either of the groove track 7 and the land track 8. Separate exclusive header regions for the groove track 7 and the land track 8 are not required.

Referring to FIG. 4A, the mirror region 12 (M) follows the first header region 11. The mirror region 12 is flat with no groove or pit formed thereon and used to determine an offset of the servo tracking.

The gap region 13 (GAP) follows the mirror region 12. The gap region 13 is formed on the information track 6' to avoid a head 24 of the information region 20 from overlapping the mirror region 12 or the first header region 11 when a jitter occurs due to the rotation of the optical disk 1.

The information region 20 which stores information and data includes a first guard data region 23 (GD1), the first dummy data region 15 (VFO), the first data region 17 (DATA), and a second guard data region 18 (GD2). The buffer region 19 (BUF) is formed between the information region 20 and the first header region 11' of the next sector 10'.

The first guard data region 23 is formed to ensure the stability of the reproduction signal processing circuit. The first dummy data region 15 is a VFO region where a specific pattern (a specific bit length) of the modulation code used for modulation of data is sequentially recorded to promptly and stably clock the PLL of the reproduction signal processing circuit. Desired user data including an error correction code is recorded on the first data region 17. The second guard data region 18 is formed following the first data region 17 to ensure the stability of the production signal processing circuit. The buffer region 19 which includes no data is formed to avoid the end of the information region 20 from overlapping the header region 11' of the next sector 10' when a jitter occurs due to the rotation of the optical disk 1, like the gap region 13.

Information is recorded on the information region 20 by irradiating the recording layer formed on the disk substrate of the optical disk 1 to change the optical properties (reflectance) of the recording layer. For example, an irradiated portion of the recording layer may be changed from a crystalline state to an amorphous state so as to form a recording mark with a reflectance different from that of the other portions. As shown in FIG. 4C, the recording mark array 22a is formed on the groove track 7, while the recording mark array 22b is formed on the land track 8.

Thus, in the rewritable area 5, the groove track 7 and the land track 8 are formed in accordance with the above-described data format to record data in the area.

Referring to FIGS. 4B and 4D, a data format in the read-only areas 2 and 3 will be described. In this example, as in Example 1, the data format in the read-only areas is matched with the data format in the rewritable area. FIG. 4B shows an exemplified data format of each sector 30 in the read-only areas 2 and 3, and FIG. 4D schematically shows a physical configuration of the track composed of the pit row 29 corresponding to the sector 30 of FIG. 4B.

In the read-only areas 2 and 3, the track 9 is composed of the pre-recorded pit row 29 (a pre-pit row). As shown in FIG. 4D, all the pit rows in the read-only areas 2 and 3 are formed in accordance with a uniform physical format. More specifically, the width (pit width) of the pit row 29 in the radial direction of the optical disk 1 is smaller than the width (groove width) of the guide groove 6 (groove track 7) formed in the rewritable area 5, and all the pits are lined substantially along the center line of the track for servo tracking.

Referring to FIG. 4B, the sector 30 in the read-only areas 2 and 3 includes the second header region 31 (sector identification data PID1 and PID2) and the second data region 37 (DATA). A second dummy data region 33 (DMY1) is formed between the second header region 31 and the second data region 37. A third dummy data region 34 (DMY2) is formed between the second data region 37 and the second header region 31' of the next sector 30'.

The sector identification data PID1 and PID2 of the second header region 31 are repeatedly recorded on the former half and the latter half of the second header region 31, respectively, in compliance with the sector identification data PID1 and PID2 of the first header region 11, so that the length of the second header region 31 becomes substantially the same as that of the first header region 11. In the second header region 31, however, the pit row is not wobbled as the pit rows 21a and 21b of the first header region 11, but is lined substantially along the center line of the track 9 for servo tracking.

The information amount recorded on the second data region 37 of one sector 30 is made equal to that of the first data region 17 of one sector 10 in the rewritable area 5, and the same format as that in the rewritable area 5 is used for an additional error correction code and the like. With this arrangement the length of the second data region 37 is substantially the same as that of the first data region 17.

In general, data recording in the read-only area is performed by embossing with high precision at the fabrication of the disk. In the read-only area, data is only reproduced and no arrangement to respond to rewriting by the user is required. Therefore, regions such as the gap region 13, the first guard data region 23, the second guard data region 18, and the buffer region 19 formed in the rewritable area are not required. These regions should be deleted if the recording capacity of the optical disk is considered with priority. However, if these regions are deleted, the data format in the read-only area becomes different from that in the rewritable area. This requires to provide two separate exclusive signal processing sections each including a timing generator and a demodulator for the read-only area or the rewritable area, and switch the two processing sections appropriately, as in the conventional apparatus described above. If regions corresponding to the gap region 13, the first guard data region 23, the second guard data region 18, and the buffer region 19 in the rewritable area 5 are formed in the read-only area so as to synchronize the reproduction timing and no pit row is formed in these regions, the tracking error signal is discontinued at these regions, making the servo tracking in the read-only area unstable.

In order to overcome the above problems, in this example, the second dummy data region 33 is formed between the header region 31 and the second data region 37 of each sector 30, and the third dummy data region 34 is formed between the second data region 37 and the second header region 31' of the next sector 30'.

A specific pattern of the modulation code used for modulation of data (a pattern of a specific bit length corresponding to a specific pulse width and pulse interval) as in the first dummy data region 15 (VFO) in the rewritable area 5, for example, can be sequentially recorded on the second and third dummy data regions 33 and 34. Using such a specific pattern, prompt and stable clocking of the PLL of the reproduction signal processing circuit can be realized.

A mirror region may be formed between the second header region 31 and the second dummy data region 33 as in the rewritable area.

When data recorded on the optical disk of this example is to be reproduced, the same procedure as that described in Example 1 with the optical disk recording/reproducing apparatus 100 shown in FIG. 3 can be employed. In this case, the waveforms of the envelope detection signal, the difference signal obtained from the rewritable ares, the sum signal obtained from the rewritable area, and the sum signal obtained from the read-only area are as shown in FIGS. 4E to 4H, respectively.

Thus, in this example, the sector lengths and main portions of the data formats of the rewritable area and the read-only areas are made substantially equal to each other. With this arrangement, the sectors in the read-only areas and the rewritable area can be managed in the same manner, and the processing such as sector retrieval can be unified. Thus, one reproduction signal processing circuit can be commonly used for the rewritable area and the read-only areas. This reduces the circuit size.

In this example, the first data region 17 in the rewritable area and the second data region 37 in the read-only area are arranged to start at the same timing as shown in FIGS. 4A and 4B. The unified sector management according to the present invention can also be realized in the case where these data regions are displaced with each other as long as they have the same length.

EXAMPLE 3

In Example 3, a data sequence which realizes stable servo tracking at the reproduction of data recorded in the read-only area will be described. In this example, the data formats in the rewritable area and the read-only areas described in Example 2 are used.

In general, the tracking control along a track of an optical disk can be performed by a variety of methods. For example, a phase difference detection method is employed as an effective tracking method for the track consisting of the pit row 29 shown in FIG. 4D, for example.

As described in Example 2, each of the second and third dummy data regions 33 and 34 shown in FIG. 4B includes a specific repetition pattern of modulation codes used for modulation of data (a pattern of a specific bit length corresponding to a specific pulse width and pulse interval). When such a specific repetition pattern is formed on adjacent tracks, however, the servo tracking by the phase difference detection method becomes unstable.

The reason why the servo tracking becomes unstable will be described in detail as follows.

Figure 5:
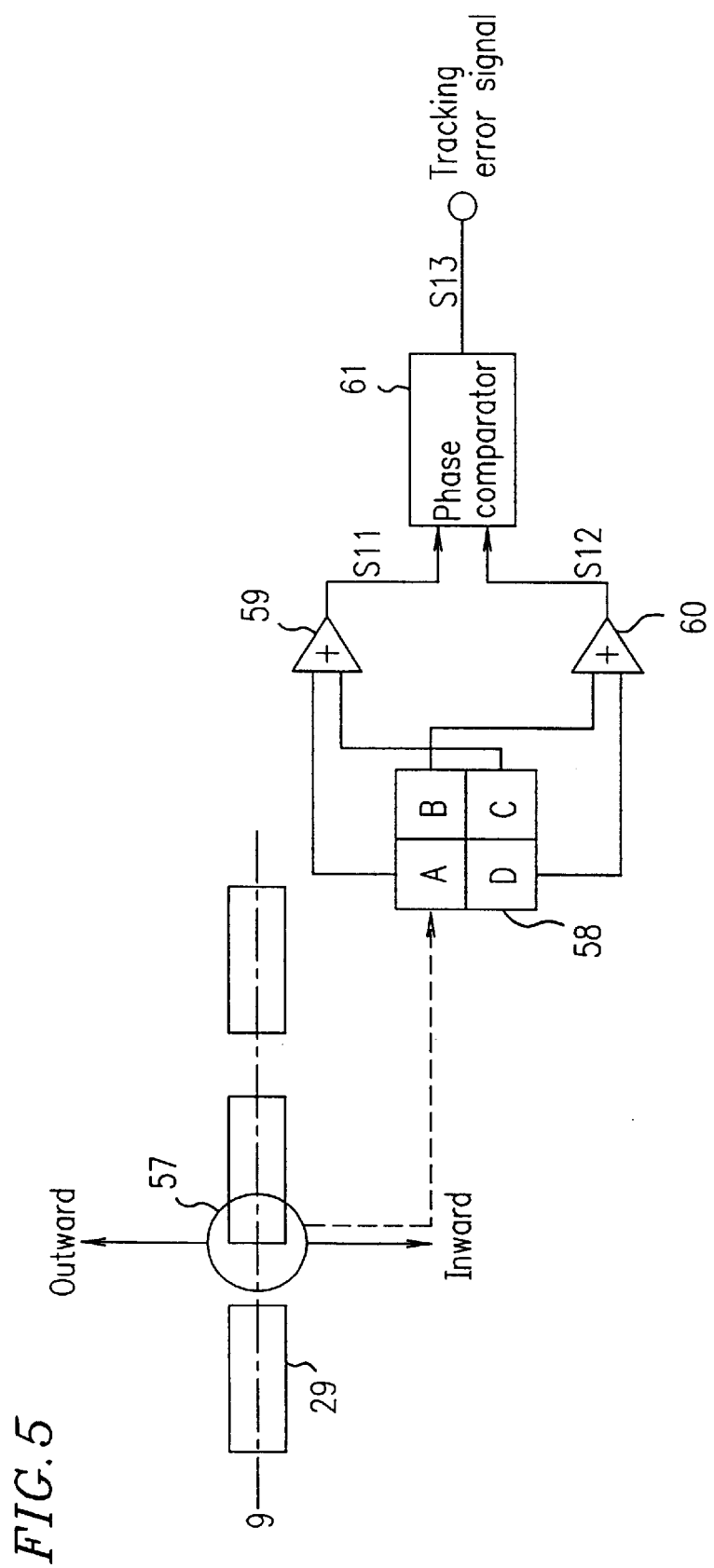
FIG. 5 is a block diagram illustrating the principle of tracking control by a phase error detection method.

The principle for obtaining a tracking error signal by the phase difference detection method will be first described with reference to FIG. 5. A beam spot 57 tracks the pit row 29 constituting the track 9. Light of the beam spot 57 is reflected by the pit row 29 and the reflected light is detected by a 4-part optical detector 58. The 4-part optical detector 58 converts the received light into an electric signal. The 4-part optical detector 58 includes four parts A, B, C, and D. A sum signal S11 corresponding to the sum of the parts A and C is generated by an operational amplifier 59, while a sum signal S12 corresponding to the sum of the parts B and D is generated by an operational amplifier 60. A phase comparator 61 compares the phases of the two sum signals S11 and S12 to generate a tracking error signal S13.

When the beam spot 57 is displaced outward from the center line of the track 9, the reflected light is diffracted at the edge of the pit row 29, and thus the phase of the sum signal S11 of the parts A and C proceeds. On the contrary, when the beam spot 57 is displaced inward from the center line of the track 9, the phase of the sum signal S12 of the parts B and D proceeds. The phase difference between the sum signals S11 and S12 is detected by the phase comparator 61 and converted into an electric signal, so as to obtain the tracking error signal S13 representing a displacement of the beam spot 57 from the center line of the track 9.

FIGS. 6 and 7 show tracking error signals obtained by the phase difference detection method when the beam spot 57 is displaced from the center line of the track. FIG. 6 shows output waveforms of the sum signals S11 and S12 obtained when completely the same data pattern has been recorded on a target track 9a (a pit row 29a) and a track 9b (a pit row 29b) adjacent to the target track 9a and the beam spot 57 deviates from the target track 9a. As shown in FIG. 6, a path 64 of the beam spot 57 is displaced from the target track 9a.

In the above case, light of the beam spot 57 is diffracted toward the parts A and B by the outward edge of the pit row 29a of the target track 9a. At this time, however, since the adjacent track 9b has the pit row 29b with the same pattern as that of the pit row 29a, the light of the beam spot 57 is simultaneously diffracted toward the parts C and D by the inward edge of the pit row 29b of the adjacent track 9b. As a result, as shown in FIG. 6, no phase difference exists between the sum signal S11 of the parts A+C and the sum signal S12 of the parts B+D. Thus, the output of the tracking error signal S13 is zero though the beam spot 57 is actually displaced from the target track 9a.

As described above, when the tracks 9a and 9b adjacent to each other have pit rows with completely the same pattern, the tracking error signal S13 is not generated even when the beam spot deviates from the track. This makes the servo tracking unstable.

FIG. 7 shows output waveforms of the sum signals S11 and S12 when a data series different from that of the target track 9a has been recorded on the adjacent track 9b. As in FIG. 6, the beam spot 57 tracks along the path 64 displaced from the target track 9a.

In the above case, as in the case shown in FIG. 6, light of the beam spot 57 is diffracted toward the parts A and B by the outward edge of the pit row 29a of the target track 9a. At this time, the light of the beam spot 57 is also diffracted toward the parts C and D by the inward edge of the pit row 29b of the adjacent track 9b. In this case, however, the patterns of the pit rows are different between the target track 9a and the adjacent track 9b. Accordingly, since edges of pits on the two adjacent tracks do not coincide except for positions 65 and 66, a phase difference is generated between the sum signals S11 and S12, though at the positions 65 and 66 the outputs of the sum signals S11 and S12 are the same as in the case shown in FIG. 6, generating no phase difference.

When patterns of the pit rows of the target track 9a and the adjacent track 9b are random having no correlation with each other, the positions where edges of pits of adjacent tracks coincide as the positions 65 and 66 shown in FIG. 7 also appear randomly. The frequency where such edge coincidence occurs is therefore sufficiently small. Such random occurrence of the pit-edge coincidence hardly affects the generation of the tracking error signal S13 in the frequency range used for the servo tracking.

However, when the phase difference between the sum signals S11 and S12 is not obtained over the entire second or third dummy data region 33 or 34 as shown in FIG. 6, for example, the tracking error signal S13 is generated so little even when the beam spot deviates from the target track that the servo tracking control becomes unstable.

Hereinbelow, data formats of the second and third dummy data regions 33 and 34 which are effective to prevent the disturbance of servo tracking as described above will be described.

FIG. 8A shows an exemplified data format where the second and third dummy data regions 33 and 34 include M-series random data regions 73 and 74, respectively. By setting different initial values of the M-series random data for at least adjacent two tracks, the patterns of pit rows on the adjacent tracks have no correlation with each other, and thus the coincidence of pit edges between the adjacent tracks is made random. As a result, the servo tracking by the phase error detection method can be relatively stably controlled.

FIG. 8B shows an exemplified data format where the second dummy data region 33 includes the M-series random data region 73 as shown in FIG. 8A and a subsequent VFO region 75 (VFO1) composed of a specific pattern of the modulation code used for modulation of data as that used on the VFO region 15 in the rewritable area (see FIG. 4A).

By including the VFO region 75 (VFO1) in the latter portion of the second dummy data region 33 as shown in FIG. 8B, the clocking of the PLL of the reproduction signal processing circuit for the subsequent data region 37 can be stabilized. The tracking error signal S13 is not generated from the VFO region 75. However, since the VFO region 75 constitutes a part of the dummy data region 33, the servo tracking can be stabilized before and after the VFO region 75. Therefore, no practical problem arises.

FIGS. 8C and 8D show exemplified data formats where the second dummy data region 33 includes data synchronous series 76 and 77, respectively, which can specify the timing of the start of the data region 37. FIGS. 8C and 8D show sectors of an even track and an odd track, respectively.

As described above, in order to secure stable servo tracking by the phase difference detection method, adjacent tracks need to have data series different from each other. The different data synchronous series 76 and 77 are therefore provided in the second dummy data regions 33 of the even track (FIG. 8C) and the odd track (FIG. 8D).

Referring to FIG. 8C, the data synchronous series 76 of the even track counts up at an end value FF (hex.). With this arrangement, due to the regularity (counting up) of the data synchronous series 76, the timing can be detected in real time until the start of the data region 37 by the second dummy data region 33. This ensures the identification of the start of the data region 37.

Referring to FIG. 8D, the data synchronous series 77 of the odd track counts down at an end value 00 (hex.). With this arrangement, due to the regularity (counting down) of the data synchronous series 77, the timing can be detected real time until the start of the data region 37 by the second dummy data region 33.

Thus, the exemplified data formats shown in FIGS. 8C and 8D where different data synchronous series are provided in the second dummy data regions 33 of the adjacent tracks can stabilize the servo tracking and ensures the detection of the start of the data region 37.

In this example, the servo tracking by the phase error detection method can be relatively stably controlled by using random data series for the second dummy data regions 33 of adjacent tracks. Also, by using different data synchronous series for the second dummy data regions 33 of adjacent tracks, the detection of the start of the data region 37, as well as stable servo tracking, can be ensured.

Data sequence suitable for servo tracking can be also used for the third dummy data region 34 in a manner similar to that described above for the second dummy data region 33. In this example, the data reproduction (servo tracking) in the read-only area was described. The data reproduction in the rewritable area can be performed in the manner described in Example 1 with reference to the optical disk recording/reproducing apparatus 100 shown in FIG. 3.

EXAMPLE 4

In Example 3 above, the pattern of data (codes) recorded on the dummy data regions can be directly generated at the data reproduction. In this example, a modulation code is used to reduce the correlation between dummy data recorded on adjacent tracks.

One value is initially determined as data to be recorded on the dummy data region. This value is scrambled to generate data with little correlation. For example, (FF), (00), and the like in the hexadecimal notation consist of bits of 0 or 1. Based on this value, data can be easily generated. Scrambling is realized by first generating random data such as an M series from a certain initial value and calculating exclusive-OR between this random data and data to be recorded. The method of generating scrambled data will be described in detail in a later example.

In the case where the same data to be recorded and the same initial values are used, data obtained after the scrambling are the same. However, if the initial values are different while the data to be recorded are the same, the correlation between two data obtained after the scrambling can be reduced. However, using different initial values for all the sectors is difficult since a considerably large number of initial values are required. In practice, however, using different initial values for adjacent sectors is enough to reduce the correlation between the dummy data regions of the adjacent tracks. That is, the same initial values can be used for sectors of the same track. In the case where the number of sectors included in one track varies, the number of continuous sectors having the same initial value should be at least the minimum number of sectors included in one track. Assume that the number of continuous sectors having the same initial value is M and the number of initial values is N. The actual values of M and N can be conveniently determined based on sector address information included in the sector identification data.

For example, if 3-byte data is used as the sector address information, about 16,770,000 sectors can be covered. If the values of M and N are powers of 2, scrambled data can be easily generated. In this example, the case of M=16 and N=16 will be described. N initial values can be obtained in the following manner, for example. First, the address information included in the sector identification data is represented in the binary notation, and 4-bit data corresponding to the fifth to eighth bits from the least significant bit are used. Using this 4-bit data, N=16 initial values can be obtained. The initial value is renewed every M=16 sectors, and one track includes 256 sectors at maximum.

Since 16 continuous sectors have the same initial value, it is ensured that the initial values for scrambling are different between adjacent sectors for tracks each having 16 to 256 sectors. Data to be recorded is scrambled using one of these initial values, modulated with recording code, and recorded on the dummy data region.

In this way, by scrambling the same data using different initial values between corresponding sectors of adjacent tracks, different data series can be recorded on the dummy data regions of the corresponding sectors of adjacent tracks.

Thus, in this example, since random data series can be effectively obtained for the dummy data regions of adjacent tracks, the servo tracking by the phase error detection method can be relatively stably controlled in the read-only area.

EXAMPLE 5

In this example, data series in the rewritable area or the read-only areas for realizing effective sector management will be described.

As described with reference to FIGS. 4A and 4B, for example, data to be recorded on the optical disk is divided into parts for a predetermined data capacity corresponding to the data region 17 (the rewritable area) or 37 (the read-only area) of each sector. An error correction code is added to the data for each sector. Such an error correction code may be complete within each sector. Alternatively, error correction coding may be performed for a set of a plurality of sectors. Such a block of a plurality of sectors is referred to as an ECC block, which is a unit for error correction coding. When one ECC block is composed of k sectors (e.g., k=16), an error having a length of about one sector can be corrected. Using such an error correction code, the number of sectors in the rewritable area and that in the read-only area are multiples of the number of sectors in one ECC block, i.e., multiples of k.

In order to effectively manage sectors of an optical disk, the sectors in the rewritable area and the read-only area are preferably managed with track basis. However, the number of sectors included in one track is not necessarily a multiple of the number of sectors included in one ECC block. Accordingly, when data is recorded on a plurality of ECC blocks of sectors, the data is not necessarily completed appropriately at the end of one track, but often ends midway of one track. In the rewritable area, the tracking control is possible even if there are remained sectors with no data recorded thereon because the groove or land track has been formed as a guide track. In the read-only area, however, the pit row is discontinued by the sector with no data recorded thereon, and thus the tracking control becomes unstable.

In order to overcome the above problem, in this example, dummy data is recorded on sectors left unrecorded after completion of recording data to fill the entire track with data so as to realize sector management with track basis. An example of such dummy data is a specific repetition pattern of a modulation code (a specific pulse width and pulse interval) as in the VFO region 15 in the rewritable area. Using such a pattern as the dummy data, the PLL of the reproduction signal processing circuit can be stably operated for the sector where user data has not been recorded.

Figure 9:
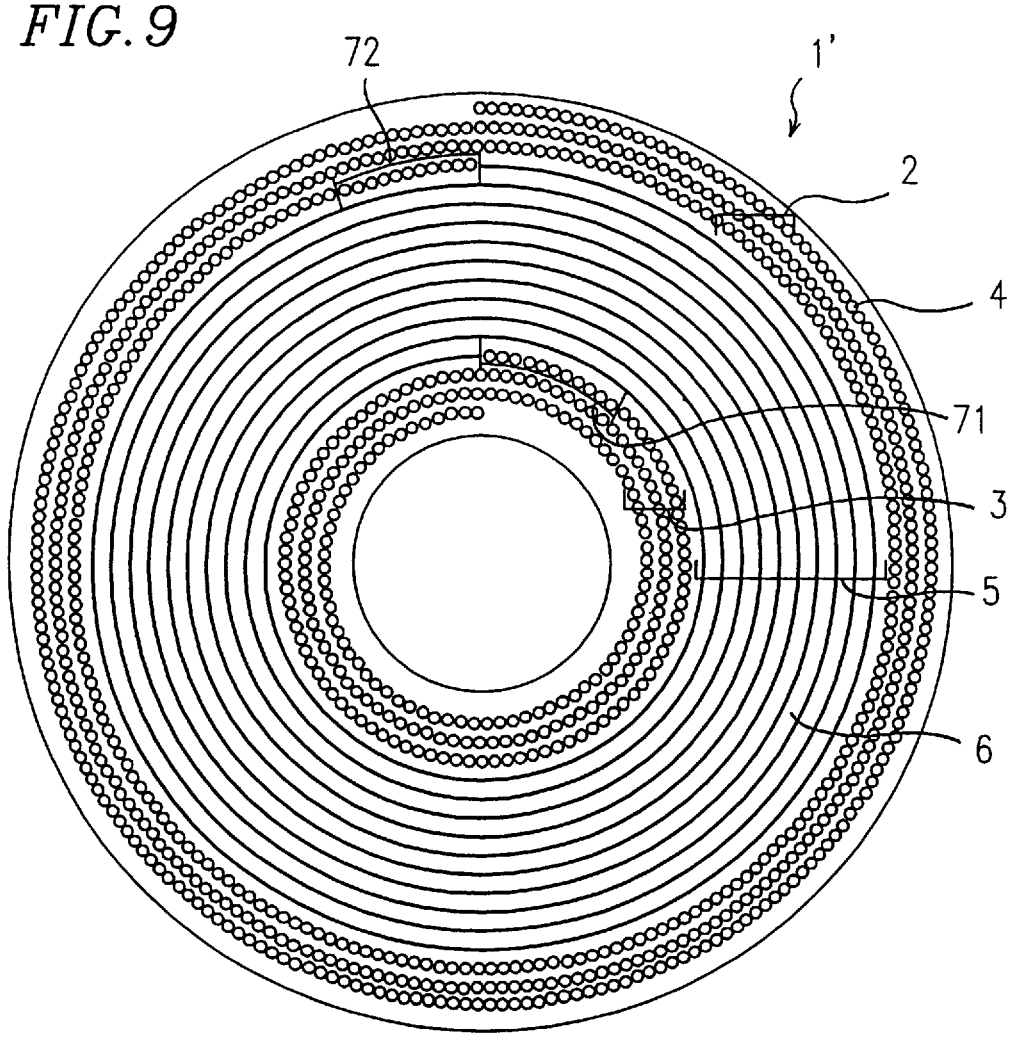
FIG. 9 illustrates an optical disk where dummy data for sector control is recorded according to the present invention.

In this example, M-series random data and a data synchronous series as in the second dummy data region in Example 3, as well as scrambled data as in Example 4, can be used. FIG. 9 shows an optical disk 1' of this example. As shown in FIG. 9, dummy data is recorded on sectors 71 in the read-only area 3 at the junction with the rewritable area 5. Likewise, dummy data is recorded on sectors 72 in the read-only area 2 at the junction with the rewritable area 5.

Thus, in this example, when data is recorded by every predetermined recording unit such as the error correction block (ECC), a sector left with no data recorded thereon is filled with dummy data. With this arrangement, the rewritable area and the read-only areas always start at the head of a track. This ensures effective management of sectors on the optical disk.

EXAMPLE 6

In Example 6, specific examples of data formats of the sector 10 in the rewritable area and the sector 30 in the read-only areas will be described.

Figure 10A:
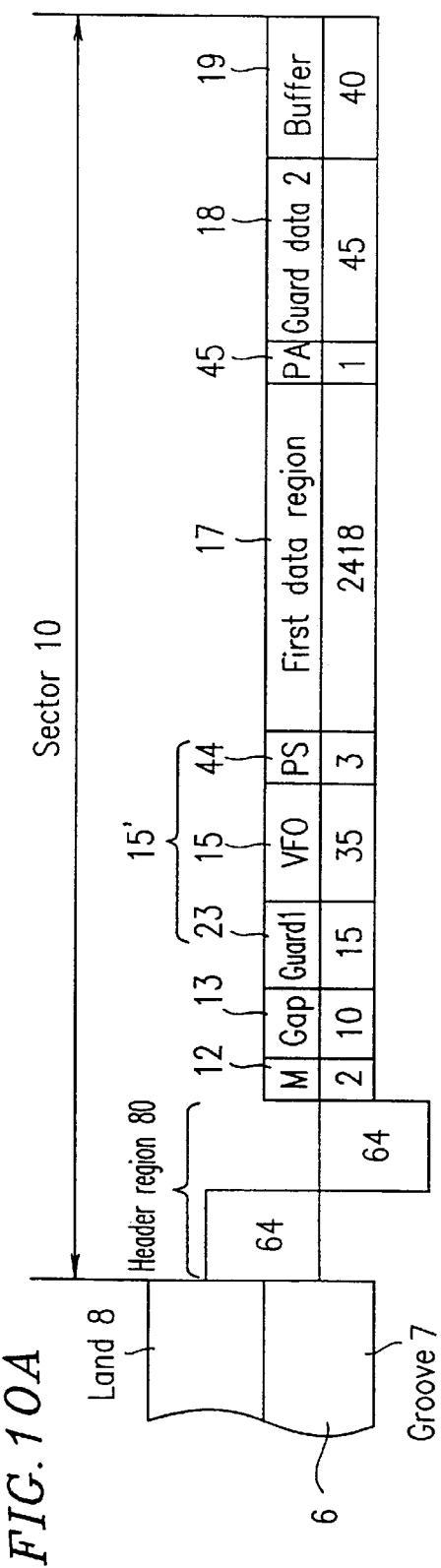
FIGS. 10A and 10B illustrate a data format in the rewritable area according to the present invention.
Figure 10B:
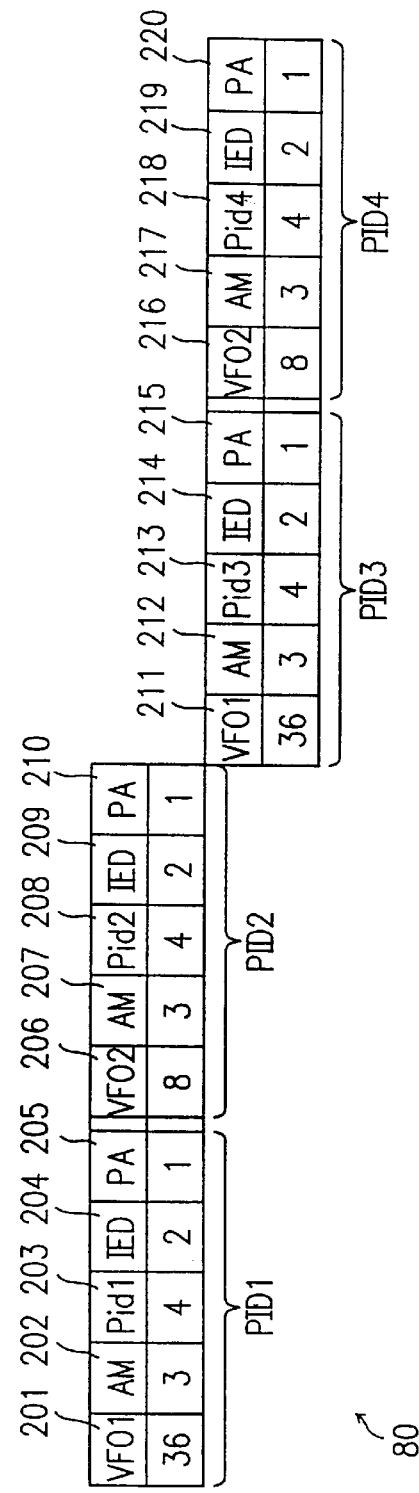
Figure 11A:
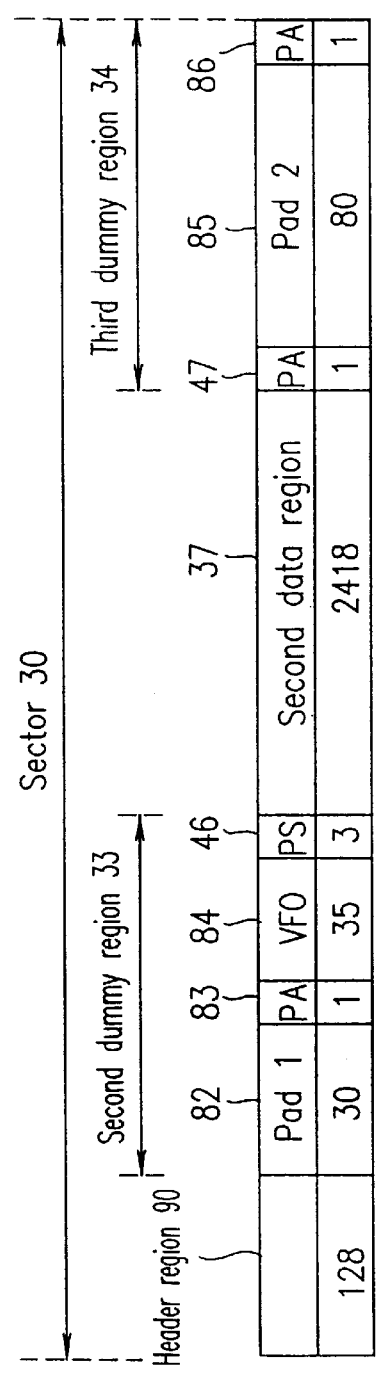
FIGS. 11A and 11B illustrate a data format in the read-only areas according to the present invention.
Figure 11B:
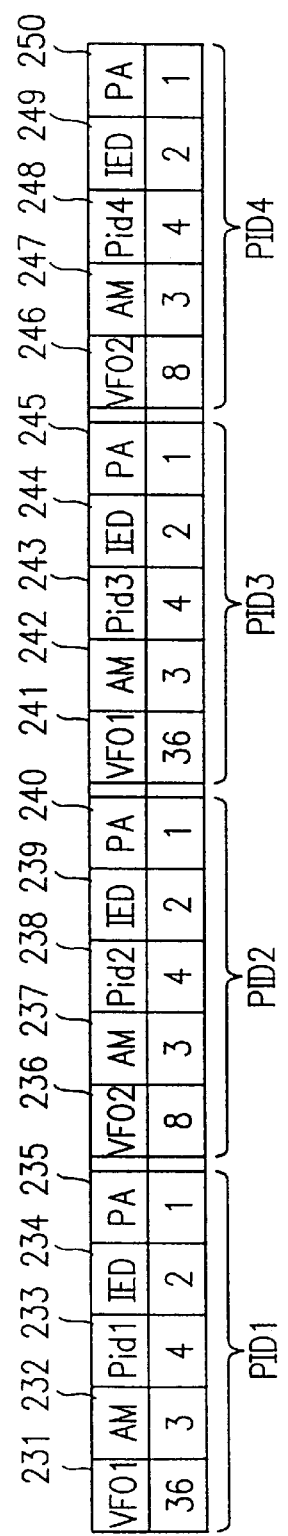

FIGS. 10A and 10B show a data format of the sector 10 in the rewritable area, while FIGS. 11A and 11B show a data format of the sector 30 in the read-only areas. First, generation of data to be recorded on the first data region 31 of the sector 10 and the second data region 37 of the sector 30 will be described.

Assume that the data amount recorded on one sector is 2048B (bytes) for both the sectors 10 and 30. To this amount, 4B for data ID indicating the data region number (sector address), 2B for IED for error detection of the data ID, 6B for RSV as spare, and 4B for EDC for error detection of the entire data are added. All of these data are collectively referred to as a first data unit. The data length of the first data unit is thus 2048+4+2+6+4=2064B.

The information data portion (2048B) is then scrambled in the manner as described below which is the same as that used for the dummy data region in Example 4.

First, a shift register is constructed so that so-called M-series data can be generated, and an initial value is determined. This initial value is sequentially shifted through the shift register in synchronization with the information data so as to generate pseudorandom data. Exclusive-OR is also operated between the pseudorandom data and the information data to be recorded bit by bit thereby to realize scrambling.

Figure 12:
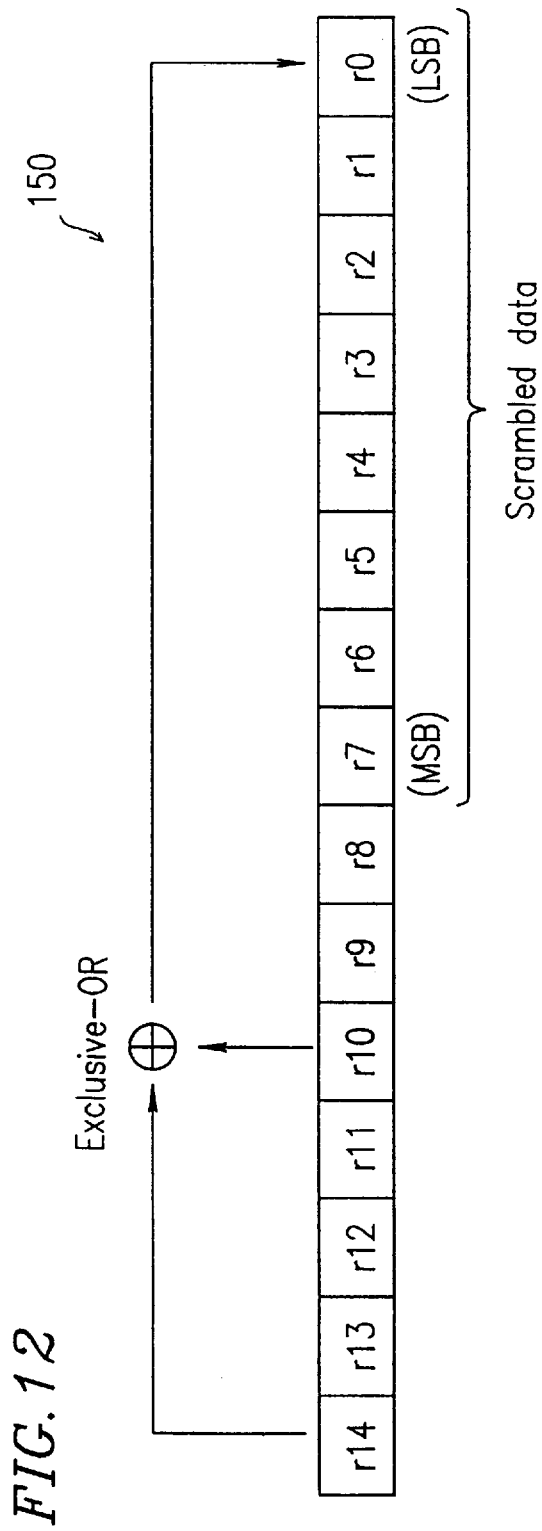
FIG. 12 illustrates a configuration of a circuit for generating scrambled data according to the present invention.

Since the information data is 2048B which is the eleventh power of 2, a primitive polynominal expression with the eleventh or higher power of 2 is required as the M series. The next higher degree in trinominal to quinquenominal expressions having a term of the eleventh or higher power of 2 among the primitive polynominal expressions constructing the M series is fifteenth. In the following description, a primitive polynominal expression having a term of the fifteenth power of 2 ($X^{15}+X^4+1$) is used as an example. FIG. 12 shows the realization of this primitive polynominal expression by use of a shift register 150.

As shown in FIG. 12, the length of the shift register 150 is 15 bits (entries r14 to r0). The shift register 150 calculates exclusive-OR between the bit in the entry r14 and the bit in the entry r10 and feeds back the result to the entry r0. A predetermined 15-bit initial value is set for the shift register 150 and is sequentially shifted in response to a bit clock, so as to generate pseudorandom data. Then, exclusive-OR is calculated between the eight least significant bits (entries r7 to r0) of the shift register 150 and eight bits (1B) of the information data every eight clocks, and this operation is repeated 2048 times. As a result, information data for one sector is scrambled. The shift register 150 is reset every sector to reset the initial value, so that the information data of each sector is independently scrambled with no substantial correlation with one another.

Assume that the number of continuous sectors having the same initial value is M and the number of initial values is N. The values of M and N can be obtained from the sector address information included in the identification data. If the values of M and N are powers of 2, scrambled data can be easily generated. In this example, the case of M=16 and N=16 will be described. N initial values can be obtained in the following manner, for example. The address information included in the sector identification data is represented in the binary notation (24 bit length if the sector address is 3B), and 4-bit data corresponding to the fifth to eighth bits from the least significant bit is used. Using this 4-bit data, N=16 initial values can be obtained. The corresponding relationship between the 4-bit value and the initial value is previously determined in the form of a table and the like. The initial value is renewed every M=16 sectors, and one track includes 256 sectors at maximum.

The scrambled first data units of 16 sectors are put together to constitute error correction codes by Reed-Solomon coding. The data unit of one sector is arranged in an array of 172B×12 rows and such units of 16 sectors are put together to form an array of 172B×192 rows. A 16B external code is added to each column of this array, and a 10B internal code is added to each row of this array. A data block of 182B×208 rows (37856B) is thus formed, which is referred to as an ECC block.

Then, the ECC block is interleaved so that the 16B external code is included in each sector. The data of each sector is then 182B×13 rows=2366B.

The data is then modulated with a recording code. A RLL (run length limited) code where the run length after modulation are limited is used as the recording code. Specifically, in this example, a 8/16 conversion code for converting 8-bit data into 16 channel bits is used as the recording code. This conversion is performed in accordance with a predetermined conversion table (state table). This conversion table allows one 8-bit data to correspond to four states of 16-channel-bit data. A state to be used for conversion of next data is also predefined in this conversion table.

Figure 13:
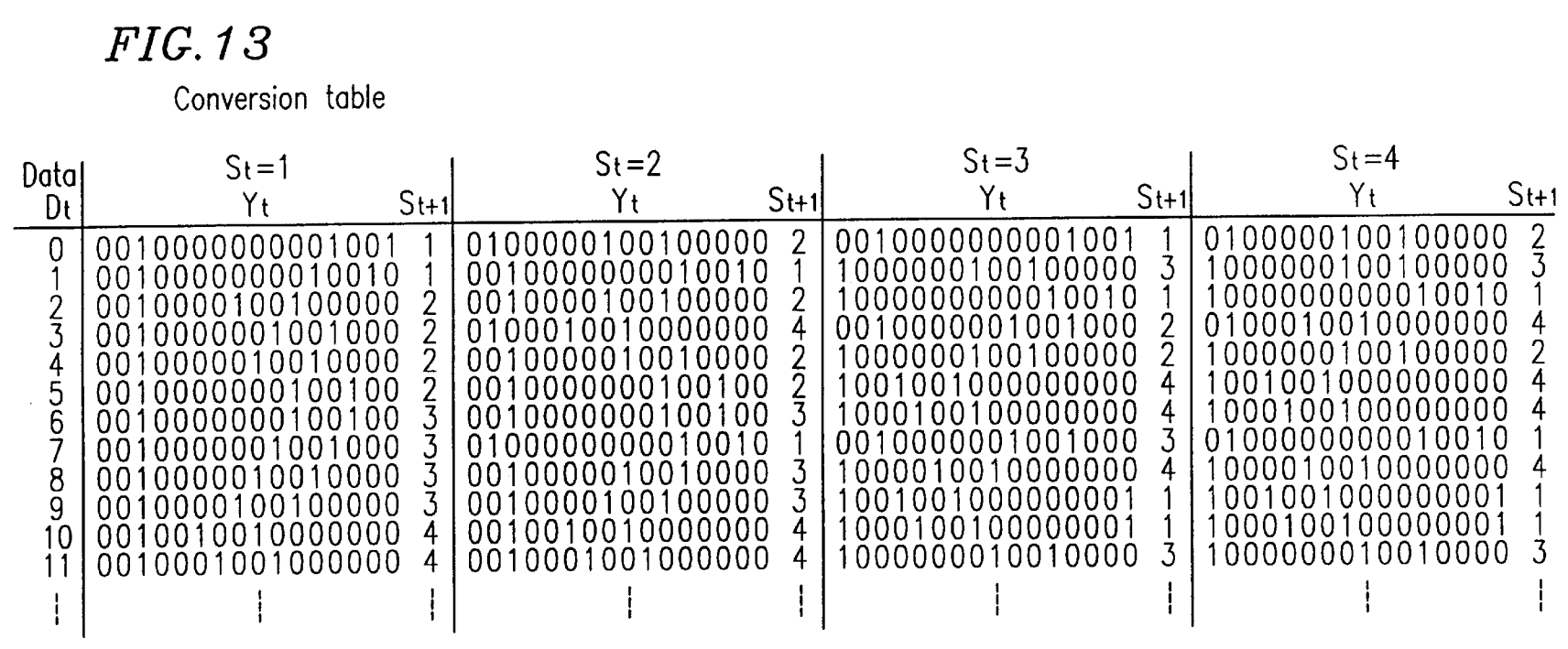

FIG. 13 shows an example of such a conversion table. A 16-bit code series ($Y_t$) is obtained, for example, by converting a first data ($D_t$) under a state 1 ($S_t=1$). The next data is selected under a state specified in the preceding conversion ($S_{t+1}$). By controlling the selection of the state, a DC component contained in the recording code can be suppressed, though the detail of the method of this control is omitted here.

At this time, the minimum and maximum bit lengths are limited to 3 channel bits and 11 channel bits, respectively. Also, in order to synchronize the reproduction, a 2B synchronous code is inserted every 91B, i.e., a half of one row of 182B. As the synchronous code, several different 32-channel-bit codes having a pattern which normally does not appear in the 8/16 conversion code are predefined. Thus, the data amount of one sector is 186B×13 rows=2418B.

The above-described data configuration is commonly employed in the rewritable area and the read-only areas. The thus-obtained 2418B data is recorded on the first data region 17 in the rewritable area as shown in FIG. 10A or on the second data region 37 in the read-only areas as shown in FIG. 11A.

Referring to FIG. 10A, in the rewritable area, a 1B postamble region 45 (PA) follows the first data region 17. The 8/16 converting code needs to have an end mark at the end of the recording code so that the data can be correctly demodulated at the reproduction. Therefore, the postamble region 45 has a pattern obtained by demodulating a predetermined code in accordance with a conversion rule as the end mark.

A presync region 44 (PS) precedes the first data region 17, where presync data is recorded in order to indicate the start of the first data region 17 and provide byte synchronization. The presync data is predetermined to be 3B (48 channel bit) long and consists of a code having a pattern with high autocorrelation. For example, a pattern of "0000 0100 0100 1000 0010 0001 0010 0000 1000 0010 0001 0000" as represented in NRZI code is used.

The VFO region 15, the first guard data region 23, the second guard data region 18, the gap region 13, the buffer region 19, and the mirror region 12 shown in FIG. 10A are the same as the corresponding ones described with reference to FIG. 4A. The first guard data region 23, the VFO region 15, and the PS region 44 constitute a first dummy data region 15'. In FIG. 10A, the number shown under each region represents the byte length of the region. This also applies to FIGS. 10B, 11A, and 11B.

In the first dummy data region 15', the VFO region 15 preceding the PS region 44 has a specific pattern for promptly and stably clocking the PLL of the reproduction signal processing circuit. For prompt and stable clocking of the PLL, it is better that the code includes more inversions (i.e., more "1's" as represented in the NRZI code). For high-density recording, however, when the shortest bit length of a modulation code is repeated, both the amplitude of the reproduction signal and the C/N are reduced, making it difficult to obtain stable clocking. Therefore, the repetition of a pattern with 4 channel bits which is the second shortest bit length, i.e., ". . . 1000 1000 . . ." as represented in the NRZI code is used. The length of the VFO region 15 is 35B in order to ensure the number of inversions and the clocking time required for stable clocking.

The first guard data region 23 precedes the VFO region 15 and the second guard data region 18 follows the PA region 45. As described in Example 4, when recording and erasure are repeated in a rewritable optical disk, the degradation at the start and end of the recording portion of the optical disk due to an increasing heat load. The guard data regions are provided to prevent this degradation from influencing the regions from the VFO region to the PA region. Each guard region should therefore be long enough to prevent this degradation.

A recording medium tends to be increasingly degraded when same data is repeatedly recorded on the same position. To avoid this trouble, the recording position of the first data region 17 is shifted by elongating and shortening the first and second guard data regions 23 and 18 preceding and following the data region 17, respectively. It should be understood however that the total of the lengths of the first and second guard data regions 23 and 18 is unchanged. From the results of experiments by the inventors of the present invention, it has been found preferable that the lengths of the first and second guard data regions 23 and 18 are (15+k)B and (45−k)B, respectively, and the shift amount is k=0 to 7B. The total of the lengths of the two guard data regions is fixed to 60B. The repetition of the 4-channel-bit pattern ". . . 1000 1000 . . ." used for the VFO region 15 is used as data to be recorded on the guard data regions, for example.

Thus, the first guard data region 23, the VFO region 15, the presync region 44, the first data region 17, the postamble region 45, and the second guard data region 18 constitute the information recording region where data is recorded with a data length of 2517B.

The gap region 13 is used to set the laser power, and has a length of 10B to secure the time required for laser power setting. The buffer region 19 has no data recorded thereon to secure a region (time width) for preventing the end of the recording data from overlapping the next sector due to a variation of the rotation of a disk motor and an eccentricity of the disk. The buffer region 19 has a length of 40B. The mirror region 12 has a length of 2B to secure the time required for determining the offset of the servo tracking.

Referring to FIG. 11A, the sector 30 in the read-only areas will be described. The sector 30 includes a header region 90, the second dummy data region 33, the second data region 37, and the third dummy data region 34. As described above, the data length of the second data region 37 is equal to that of the first data region 31, i.e., 2418B. As in the sector 10, a 1B postamble region 47 (PA), a second pad region 85, and a postamble region 86 (PA) follow the second data region 37 in this order.

In this example, as in Example 2, the second dummy data region 33 is formed between the header region 90 and the second data region 37, while the third dummy data region 34 is formed between the second data region 37 and the head of the next sector. As in the sector 10 in the rewritable area, the second dummy data region 33 includes a 35B VFO region 84 and a p3B presync region 46 (PS) to secure the reliability at the reproduction of data from the data region 37. The second dummy data region 33 further includes a 30B first pad region 82 and a postamble region 83 as shown in FIG. 11A. The third dummy data region 34 includes the postamble region 47, the second pad region 85, and the postamble region 86.

The patterns and lengths of data to be recorded on the VFO region 84 and the presync region 46 are the same as those recorded on the VFO region 15 and the presync region 44 shown in FIG. 10A. As the data to be recorded on the second and third dummy data regions 33 and 34, data series obtained by scrambling hexadecimal (FF) data using different initial values between adjacent sectors and modulating the results with the 8/16 conversion codes as described in Example 4 are used. The scrambling is performed in the same manner used for the second data region 37. As the initial value, 4-bit data corresponding to the fifth to eighth bits from the least significant bit of the PID which will be described later is used. The initial value corresponding to the 4-bit data is the same as that used for the second data region 37.

The 8/16 conversion coding starts from the state 4 in the conversion table shown in FIG. 13, for example. The thus-generated data series is recorded on the first and second pad regions 82 and 85. The first pad region 82 corresponds to the gap region 13 and the first guard data region 23 shown in FIG. 10A, while the second pad region 85 corresponds to the second guard data region 18 and the buffer region 19 shown in FIG. 10A.

In the rewritable area, the lengths of the first and second guard data regions 23 and 18 are varied. In the read-only areas, the lengths of the pad regions are made to correspond to the average lengths of the corresponding first and second guard data regions 23 and 18. Thus, the lengths of the first and second pad regions 82 and 85 are 30B and 80B, respectively. The 1B postamble regions 83 and 86 follow the first and second pad regions 82 and 85, respectively, to terminate the modulation code.

The header regions in the rewritable area and the read-only areas will be described. As described in Example 2 with reference to FIG. 4A, the header region 11 in the rewritable area is divided into the former half 11a (sector identification data PID1) and the latter half 11b (sector identification data PID2). The corresponding pit rows 21a and 21b are displaced toward the opposite directions from the center line of the groove track 7 (the guide groove 6) by about a quarter of the groove pitch. In this example, also, the header region 80 is formed in the same manner.

FIG. 10B shows a data format of the header region 80 of the sector 10 in the rewritable area. As shown in FIG. 10B, the header region 80 is composed of four sets of sector identification data (PID) denoted by PID1, PID2, PID3, and PID4. The PID1 and PID2 constituting the 64B former half is displaced outward, while the PID3 and PID4 constituting the 64B latter half is displaced inward, for example.

In each sector identification data PID, 4B is allocated for a Pid region representing the sector address information, 3B for the sector number, and 1B for various types of information of the sector such as the number of the Pid region. The address information of the sector on the groove track 7, from which the header region is displaced with respect to the center line, is recorded on a Pid3 region 213 in the PID3 and a Pid4 region 218 of the PID4 in the latter half. The address information of the sector on the land track 8 outward adjacent to the groove track 7 is recorded on a Pid1 region 203 of the PID1 and a Pid2 region 208 of the PID2 in the former half.

Respective 2B error detection codes are added to the Pid regions and recorded on IED regions 204, 209, 214, and 219. The data of the Pid regions and the IED regions are modulated with the above-described 8/16 conversion code. This modulation is initiated at the head of each Pid region using the conversion table shown in FIG. 13, for example, starting from the state 1. Respective 1B postamble regions 205, 210, 215, and 220 follow the IED regions to terminate the modulation code.

AM regions 202, 207, 212, and 217 precede the corresponding Pid regions and has an address mark indicating the start of the Pid regions and realizing byte synchronization. As the address mark, a pattern which does not appear in the 8/16 conversion code, e.g., a 3B (48 channel bit) long code. For example, a pattern "0001 0001 0000 0000 0000 0100 0100 0100 0000 0000 0001 0001" as represented in the NRZI code can be used. This pattern includes two 14-channel-bit patterns longer than the longest bit length, i.e., 11-channel-bit length, of the modulation code. Therefore, the possibility of erroneous detection of the address mark at the reproduction of normal data reduces.

A VFO region is provided at the head of each sector identification data PID. The VFO region has data of a specific pattern to promptly and stably clock the PLL of the reproduction signal processing circuit. For example, the repetition of the 4-channel-bit pattern ". . . 1000 1000 . . ." may be used as in the VFO region described in Example 2. As described above, the former half PID1 and PID2 and the latter half PID3 and PID4 of the header region 80 are displaced toward the opposite directions from the center line of the groove track. The first VFO regions 201 and 211 which are the heads of the former and the latter halves of the header region 80 need to give more than one chance for bit synchronization to ensure the bit synchronization. Accordingly, the first VFO regions 201 and 211 are made longer than the second VFO regions 206 and 216 which are used only for re-synchronization and therefore can be short. In this example, the lengths of the first VFO regions 201 and 211 are 36B, while the lengths of the second VFO regions 206 and 216 are 8B.

Thus, the PID1, for example, includes the VFO region 201 (VFO1), the AM region 202, the Pid region 203, the IED region 204, and the postamble region 205 in this order, and has a length of 46B. Likewise, the PID2 includes the VFO region 206 (VFO2), the AM region 207, the Pid region 208, the IED region 209, and the postamble region 210 in this order, and has a length of 18B. The PID3 and the PID4 of the latter half have the similar configurations to the above.

The header region 90 in the read-only areas will be described with reference to FIGS. 11A and 11B. As described in Example 2 with reference to FIGS. 4A and 4B, the data arrangement of the header region 31 in the read-only areas is matched with the data arrangement of the header region 11 in the rewritable area, but the pit row on the header region 31 is lined along the center line of the track 9. The header region 90 in this example is formed in the manner described in Example 2. That is, the data sequence and the length (bit length) of the header region 90 in the read-only areas are made equal to those of the header region 80 in the rewritable area (FIG. 10A). More specifically, as shown in FIGS. 11A and 11B, the header region 90 with a length of 128B is composed of four sector identification data PIDs (PID1 to PID4). The PID1, for example, includes a first VFO region 231 (VFO1), an AM region 232, a Pid region 233, an IED region 234, and a postamble region 235 in this order, and has a length of 46B. Likewise, the PID2 includes a second VFO region 236 (VFO2), an AM region 237, a Pid region 238, an IED region 239, and a postamble region 240 in this order, and has a length of 18B. The PID3 and the PID4 of the latter half have the similar configurations to the above.

Thus, in this example, different data series can be formed on the dummy data regions 33 or 34 on adjacent tracks in the read-only areas. This can be realized by scrambling predetermined fixed data (e.g., FF) in the same manner as that for data recorded on the second data region 37, using different initial values between adjacent sectors. The resultant scrambled data is then modulated with the recording code used for the data on the second data region 37 and recorded on the pad region 82 or 85. In this way, the servo tracking by the phase error detection method can be relatively stably controlled in the read-only areas. A scrambling circuit and a recording coding circuit used for generating data to be recorded on the second data region 37 can also be used for generating data to be recorded on the pad regions 82 and 85. This simplifies the configuration of a recording signal processing circuit, and the circuit size can be reduced.

In this example, the position of the first data region 17 was shifted by enlarging and shortening the first and second guard data regions 23 and 18. Alternatively, the gap region 13 and the buffer region 19 may be enlarged and shortened. The combination of the enlarging and shortening of these four regions may also be used.

EXAMPLE 7

In Example 6, exemplified data series on the sectors 10 and 30 in the rewritable area and the read-only areas were described. As shown in FIGS. 10A and 11A, the presync region 44 is formed following the VFO region 15 and preceding the first data region 17 in the rewritable area, while the presync region 46 is formed following the VFO region 84 and preceding the second data region 37 in the read-only areas.

Figure 23:
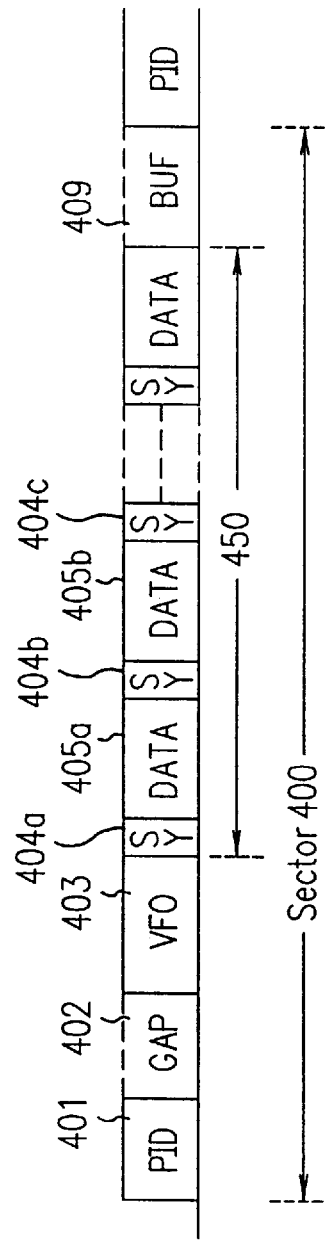
FIG. 23 illustrates a data format of the conventional optical disk.

In the conventional optical disk as shown in FIG. 23, for example, the data region 450 immediately follows the VFO region 403. The data region 450 is composed of a plurality of data blocks 405*a*, 405*b*, . . . with the data synchronous series 404*a*, 404*b*, . . . preceding the corresponding data blocks.

In such a conventional data format, at the reproduction, after stable clocking of the PLL circuit by the VFO region 403, the data synchronous series 404*a* is detected. By the detection of the data synchronous series 404*a*, the head of the data region 450 is identified to reproduce the first data block 405*a*.

The above conventional configuration has a drawback as follows. If the recording layer of the optical disk is damaged at the portion of the first data synchronous series 404a which specifies the start timing for the first data block 405a, for example, an error arises in the synchronous data to be read, failing to specify the start position of the first data block 405a.

Moreover, when the start position of the first data block 405a is failed to be specified, not only the start position of the first data block 405a but also the block number of the subsequent data block 405b cannot be specified. Errors therefore arise over the entire data region 450 of the sector, and reading of the data becomes impossible.

However, according to the data format in Example 6 described above, which has the presync region following the VFO region, the start timing of the first data block can be detected with high reliability even if an error arises in the first data synchronous series of the data region.

In Example 7, the presync region will be described in detail.

FIG. 14A shows a data format of one sector in the rewritable area of an optical disk of this example. FIG. 14B shows a data format of one sector in the read-only areas of the optical disk of this example. In FIGS. 14A and 14B, the same components as those in the previous examples are denoted by the same reference numerals.

Referring to FIG. 14A, the sector 10 includes the header region 80 (sector identification data PID), the mirror region 12 (M), the gap region 13 (GAP), the first guard data region 23 (GD1), the VFO region 15, the presync region 44 (PSY), the first data region 17 (DATA), the postamble region 45 (PA), the second guard data region 18 (GD2), and the buffer region 19 (BUF). The first data region 17 is divided into a plurality of data blocks 5a, 5b, . . . with first data synchronous series 4a, 4b, . . . preceding the respective data blocks.

The mirror region 12 is a flat portion with no pit or groove formed thereon and used to obtain an offset of the tracking. The first and second guard data regions 23 and 18 have predetermined data patterns for compensating a cycle degradation due to heat load. The first guard data region 23 is located at the head of the recording data while the second guard data region 18 is located at the end of the recording data. The gap region 13 absorbs signal disturbance at the start and end of data recording and sets the recording laser power. The VFO region 15 includes a third data synchronous series where a predetermined code of a single period is sequentially recorded. The presync region 44 includes a second data synchronous series for specifying a start position of data reproduction, which will be described in this example in detail. The postamble region 45 terminates a modulation code and allows the reproduction signal processing to be shifted stably to a next sector.

Referring to FIG. 14B, in the read-only areas, the sector 30 includes the pad region 82 (DMY) and the postamble region 83 (PA), in place of the gap region 13 and the first guard data region 23 in the rewritable area, and the pad region 85 (DMY) and the postamble region 86 (PA), in place of the second guard data region 18 and the buffer region 19 in the rewritable area, so as to stabilize the tracking. The other portions of the sector 30 is the same as those of the sector 10 shown in FIG. 14A.

The second data synchronous series recorded on the presync region 44 of the sector 10 in the rewritable area and the presync region 46 of the sector 30 in the read-only areas will be described in detail. Herein-below, the presync region 44 of the sector 10 will be described as an example. It should be understood that the same is also applicable to the presync region 46 of the sector 30.

As described above, the data format of this example includes the second data synchronous series (the presync region 44 or 46) between the first data synchronous series 4a as the head of the data region and the third data synchronous series (the VFO region 15 or 84). A predetermined pattern which has high autocorrelation and does not appear in the other data portions is used for the second data synchronous series so that a specific position can be detected in the code sequence.

At the signal reproduction, the third data synchronous series (the VFO region 15) is first reproduced to allow the PLL circuit to be clocked stabilized by detecting the single-period repetition pattern. After the sufficient stabilization of the clocking, the position of the second data synchronous series (the presync region 44) is detected. From this detected position, the read start position of the first data synchronous series 4a located at the head of the data region can be specified. The synchronization with the data of the data region 17 is established by use of the first data synchronous series 4a, and thus the data can be reproduced at a further precise timing.

In the case where the data region 17 is divided into a plurality of data blocks as shown in FIG. 14A, a plurality of first data synchronous series 4a, 4b, . . . corresponding to the respective data blocks are formed on the data region 17. This increases the redundancy, and therefore, in order to secure a sufficient recording region for user data, each data synchronous series should be short. On the contrary, since only one second data synchronous series (PSY 44) exists in one sector, the second data synchronous series can be made long.

Thus, in this example, the position of the relatively long second data synchronous series (PSY 44) can be detected without fail. From the detected position of the second data synchronous series (PSY 44), the read start position of the first data synchronous series 4a located at the head of the data region 17 can be identified. This allows the first data synchronous series 4a to be shortened without reducing stable detection there-of.

An exemplified code pattern of the second data synchronous series will be described. In this example, as the recording code, the 8/16 code is used, which converts 8 bits of data into 16 channel bits of the recording code having a bit length of 3 channel bits at minimum to 11 channel bits at maximum. The interval of one channel bit is represented by T. The data is represented in the NRZI code where the signal level is inverted at bit "1" while it is not inverted at bit "0". The second data synchronous series needs to satisfy the limit of the mark/space lengths of the recording code.

Accordingly, the shortest recording bit length is "100". In order to ensure stable reproduction, the third data synchronous series (VFO 15) needs to have a period longer than the shortest recording bit and include much edge information (level inversion) which ensures the clocking of the PLL. In this example, therefore, a code series composed of repetition of "1000" is used as the third data synchronous series to be recorded on the VFO region 15. The mark/space lengths of the VFO region 15 are therefore 4T.

Since the second data synchronous series of the presync region 44 is detected after the clock synchronization by the third data synchronous series of the VFO region 15 as described above, using the code capable of synchronizing every 4 T further ensures the synchronous reproduction. Consequently, it is effective to use a combination of a 4-channel-bit patters as the second data synchronous series.

In the case where the average of the mark/space lengths of the second data synchronous series is close to the period of the repetition pattern of the third data synchronous series of the VFO region (hereinafter, such a pattern is referred to as the VFO pattern), symbols "1" represented in the NRZI code are located at similar positions between the two data synchronous series. This increases the probability of mistakenly detecting the VFO pattern for the second data synchronous series. In this example, therefore, the inter-code distance between the second data synchronous series and the VFO pattern is made large. However, in order to make the average of the mark/space lengths of the second data synchronous series smaller than the period 4 T of the VFO pattern, a pattern 3 T which is the shortest recording bit length needs to be included frequently. This reduces the stability at the data reproduction. In order to overcome this problem, the average of the mark/space lengths of the second data synchronous series is made longer than the period 4 T of the VFO pattern.

The second data synchronous series in this example is 4 bit long, and composed of a combination of plurality of code symbols including a code symbol having a single level inversion, i.e., "0001", "0010", "0100", and "1000" and a code symbol having no level inversion, i.e., "0000".

A further specific example of the code series constituting the second data synchronous series will be described. In this example, the above-described 8/16 conversion code is used. As will be described later, since a 2-byte code is used as the first data synchronous series, three bytes are used for the second data synchronous series. When converted with the 8/16 conversion code, the second data synchronous series has a length of 48 bit long as the recording channel bits. That is, in terms of the above combination of 4-bit long code symbols, it has a length of 12 symbols. Hereinbelow, four specific examples of the code series will be described.

(1) Pattern 1
"0100 0010 0100 0010 0010 0010 0100 0100 1000 0010 0100 1000".

Pattern 1 is the same as the pattern standardized in ISO/IEC 10089 and composed of three types of symbols, "0100", "0010", "1000".

(2) Pattern 2
"1000 0100 0100 1000 0010 0001 0000 1000 0010 0100 0100 00011".

Pattern 2 is composed of five types of symbols, "0100", "0010", "1000", "0001", "0000".

(3) Pattern 3
"0000 0100 0100 1000 0010 0001 0010 0000 1000 0010 0001 00011".

Pattern 3 is composed of the same five types of symbols as Pattern 2.

(4) Pattern 4
"0000 0100 0100 1000 0010 0001 0010 0000 1000 0010 0001 0000".

Pattern 4 is also composed of the same five types of symbols as Pattern 2. This unique pattern was first discovered by the Inventors of the present invention, and exhibits resistance to errors and excellent detection results as the data series of the PSY region 44 interposed between the VFO region 15 and the data region 17.

FIG. 15 shows the comparison of the characteristics of the above patterns 1 to 4 with respect to the average of the mark/space lengths, the maximum and minimum of the mark/space lengths, the number of symbols constituting the pattern, and the absolute value of the digital summing value (DSV).

As is observed from FIG. 15, the maximum and minimum of the mark/space lengths generated in all patterns is 3 T and 6 T, respectively, satisfying the limit values for the modulation with the 8/16 modulation code (maximum length 11 T, minimum length 3 T).

The averages of the mark/space lengths of pattern 1 to 4 are preferably different from the repetition period 4 T of the third data synchronous series as described above. As is observed from FIG. 15, the average of the mark/space lengths of pattern 1 is 3.7 T which is relatively close to 4 T. This is because all of the three types of symbols constituting the code series of pattern 1 include "1" among the four bits. Since pattern 1 does not include the symbol "0000", it is difficult to obtain the average of the mark/space lengths larger than 4 T.

On the contrary, since the code series of patterns 2 to 4 are composed of five types of symbols including the symbol "0000", the average of the mark/space lengths can be made longer than 4 T.

The digital summing value (DSV) can be used as an indicator representing the characteristics of the recording code. The DSV is obtained by converting "1" and "0" as represented in the NRZI code into "1" and "−1", respectively, and summing all the bits of the code. When the DSV is zero, the DC component included in the recording code is zero, and thus the DC component in the reproduction signal does not vary. This makes it possible to stably convert the reproduction signal into a binary value. As is observed from FIG. 15, the DSV is 0 for pattern 4.

The detection of the second data synchronous series (the PSY region) will be described.

Figure 16:
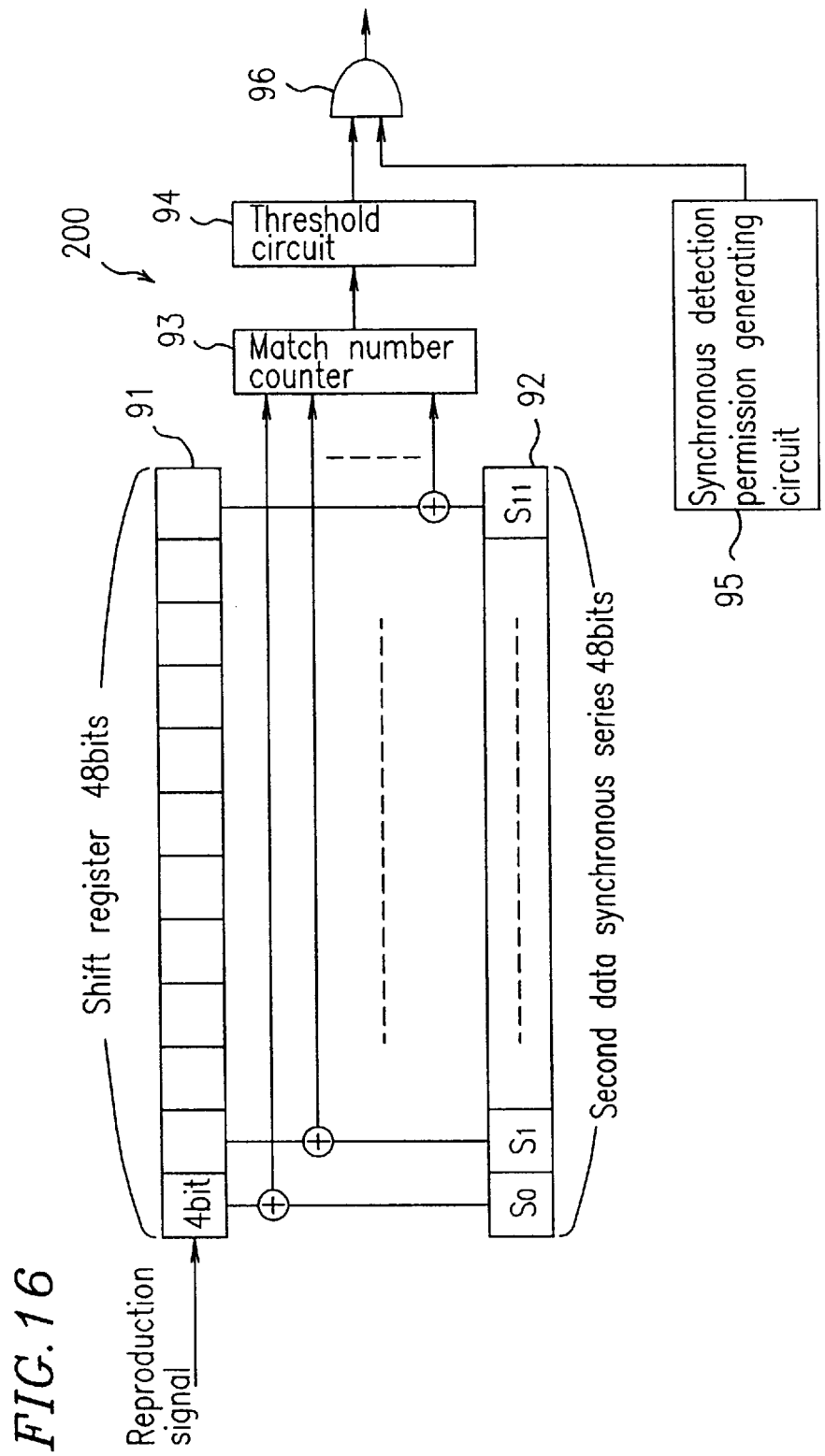
FIG. 16 illustrates a configuration of a detection circuit for the second data synchronous series.

FIG. 16 shows a PSY detection circuit 200 for detecting the second data synchronous series. Referring to FIG. 16, the PSY detection circuit 200 includes a first shift register 91, a second register 92, a match number counter 93, a threshold circuit 94, a synchronous detection permission generating circuit 95, and an AND circuit 96. In this example, as described above, the second data synchronous series is assumed to have 48 bits, i.e., 12 4-bit symbols $S_0$ to $S_{11}$. The pattern of the second data synchronous series is therefore represented by a symbol sequence $S_0, S_1, S_2, \ldots S_{11}$.

First, the pattern of the second data synchronous series (symbol sequence) $S_0, S_1, S_2, \ldots S_{11}$ is held in the second register 92. Then, a reproduction signal for the PSY detection is input into the first shift register 91 and sequentially shifted. The second synchronous series $S_0$ to $S_{11}$ held in the second register 92 is then compared with the reproduction signal every four bits, i.e., every symbol. The number of matched symbols is counted by the match number counter 93, and the count value is output to the threshold circuit 94. The threshold circuit 94 has a preset threshold for determining whether or not the second data synchronous series has been detected. When the count value output from the match number counter 93 exceeds the threshold, a detection signal is output from the threshold circuit 94. For example, assuming that the threshold is preset at 8, the threshold circuit 94 outputs a detection signal when the input reproduction signal and the second synchronous series $S_0$ to $S_{11}$ match by eight symbols or more. As long as no error arises in the reproduction signal, all of the 12 symbols should match with the signal value of the first shift register 91 when the second data synchronous series is exactly detected by shifting each bit of the first shift register 91 one by one. The synchronous detection permission generating circuit 95 outputs a gate signal indicating the time period during which the second data synchronous series should be detected. When the threshold circuit 94 detects the second data synchronous series during this detection time period, the detection signal for the second data synchronous series is output from the AND circuit 96 to a system control circuit (not shown).

In this example, the pattern match was performed every 4-bit symbol. The pattern match may also be performed for another number of bits, e.g., every bit.

A specific example of the data format shown in FIG. 14A with a specific code pattern allocated for each region will be described. This specific example is also applicable to the data format shown in FIG. 14B. FIG. 17 shows an example of part of the data format from the VFO region 15 to the first data block 5a.

Referring to FIG. 17, the VFO region 15 has at least 64 bits of a repetition pattern of "1000" as the third data synchronous series. The first data synchronous series 4a of the data region 17 following the second data synchronous series of the PSY region 44 has a 32-bit pattern 4a-1 of "0001001001000100 000000000000010001" or a 32-bit pattern 4a-2 of "0001001000000100 0000000000010001". In FIG. 17, 16 bits of the head portion of the data block 5a following the first data synchronous series 4a is shown.

Hereinbelow, the pattern match obtained in the PSY detection will be described using patterns 1 and 4 of the second data synchronous series described above.

Figure 19A:
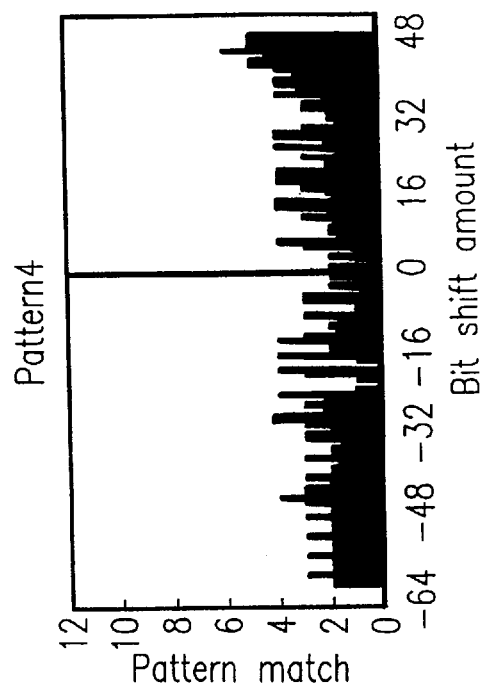
FIGS. 19A and 19B are graphs illustrating autocorrelation functions of patterns 1 and 4 obtained when a reproduction signal includes no error.
Figure 19B:
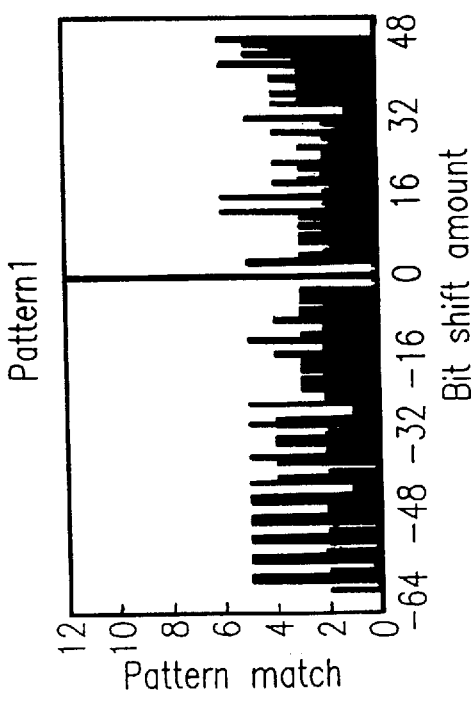

As shown in FIG. 17, the detection of the second data synchronous series is performed using a 48 bit wide detection window 97. A reference position is defined as the position where the match of all of the 12 symbols should be obtained as long as no error arises. At the detection, the detection window 97 is shifted within the range of −64 bits leftward to +48 bits rightward from the reference position. Every four bits of the input signal are compared with each symbol of the second data synchronous series as described above, to obtain the number of pattern matches. The results are shown in FIGS. 19A and 19B, which are graphs generally referred to as autocorrelation function diagrams. The threshold of the number of the pattern matches is preset at 8, and the position where eight symbols or more have matched is determined as a detection position for the second data synchronous series.

In order to consider the influence of the first data synchronous series 4a and the data block 5a at the practical detection of the second data synchronous series, the results shown in FIGS. 19A and 19B have been determined in the following manner. One of the patterns 4a-1 and 4a-2 of the first data synchronous series is selected so that the selected one gives the larger number of pattern matches at each time (i.e., the one which more adversely influences the detection of the second data synchronous series is selected). When the detection window 97 shifts rightward from the reference position by about 40 bits or more, the data block 5a following the first data synchronous series 4a is included in the range of the detection window 97 as shown in FIG. 17. In this case, the pattern of the data block 5a (first 16 bits) greatly influences the detection of the second data synchronous series. To prepare for the worst case, a pattern of the data block 5a (16 bits) where the number of pattern matches is largest is used in this example.

As a result, as will be observed from FIGS. 19A and 19B, when the detection window 97 is shifted leftward from the reference position (i.e, the position of bit shift 0), the maximum number of pattern matches is 5 for pattern 1, while it is 4 for pattern 4. Also, when the detection window 97 is shifted rightward from the reference position within the range of 40 bits from the reference position, the maximum number of pattern matches is 6 for pattern 1, while it is 4 for pattern 4. The number of pattern matches when the detection window 97 is shifted from the reference position is desirably as small as possible so as to prevent the second data synchronous series from being mistakenly detected. Accordingly, with respect to the bit shift, the autocorrelation characteristics of the second data synchronous series is better when pattern 4 is used.

Figure 18A:
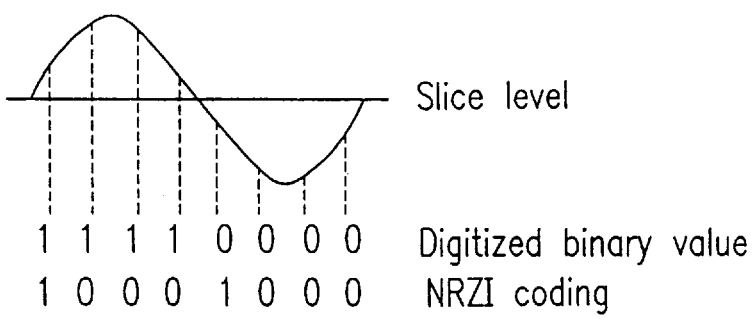
FIGS. 18A to 18C illustrate shifts in a slice level for conversion to binary codes.
Figure 18B:
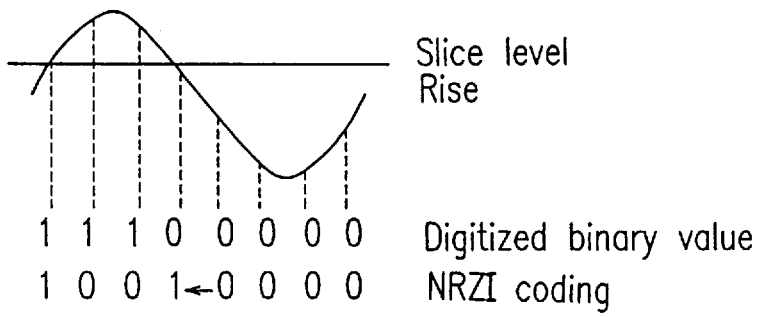
Figure 18C:
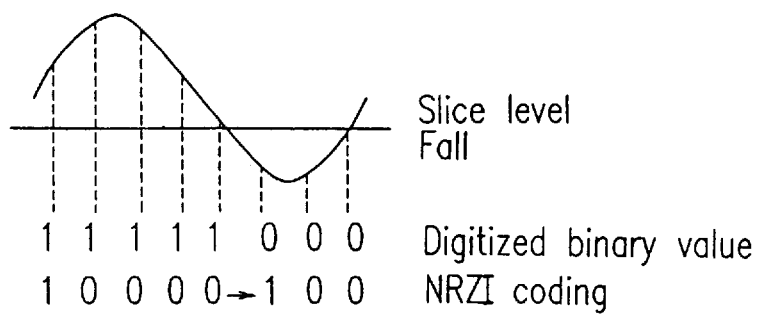

The autocorrelation of each pattern of the second data synchronous series when edge shift or slice level variation occurs has been examined. Herein, 1-bit edge shift refers to a one-bit shift of a reproduction signal where, for example, the reproduction signal which should be "00100" is changed to "01000" or "00010". FIGS. 18A to 18C are graphs showing the slice level variation. A slice level is used as a measure for digitizing a reproduction signal into a binary value. When the value of a sampled reproduction signal is larger than the slice level, it is set at "1". The result of the digitized binary value is represented in the NRZI code. The slice level is normally set at the center of the amplitude of the reproduction signal as shown in FIG. 18A. However, the slice level may rise or fall as shown in FIGS. 18B and 18C, varying the measure for digitizing into a binary value. As a result, the signal series which should be reproduced as "10001000" in the NRZI code as shown in FIG. 18A is reproduced as "10010000" when the slice level rises as shown in FIG. 18B or reproduced as "10000100" when the slice level falls as shown in FIG. 18C.

Figure 20B:
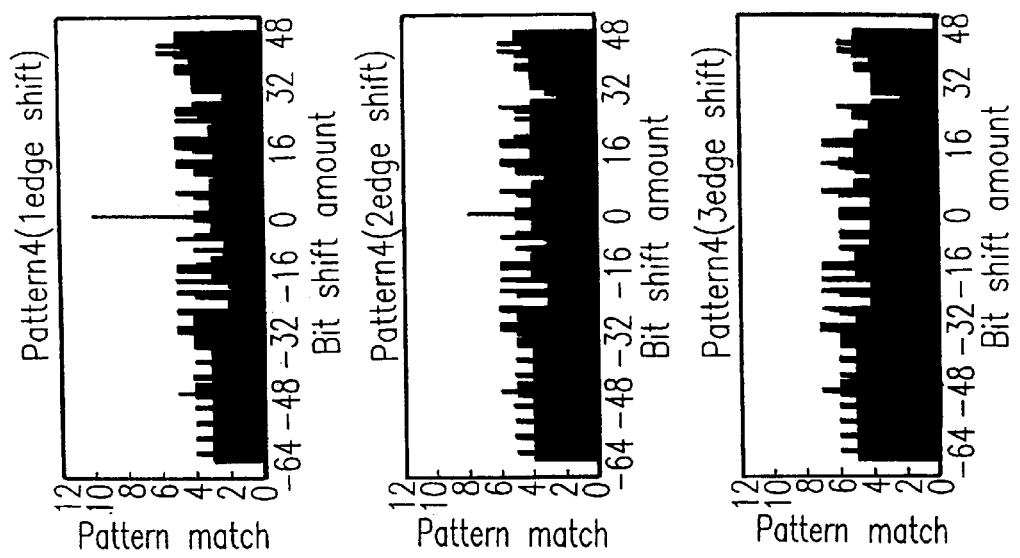
FIGS. 20A and 20B are graphs illustrating autocorrelation functions of patterns 1 and 4 obtained when edge shift occurs at one to three position(s) within a synchronous pattern detection window.
Figure 20A:
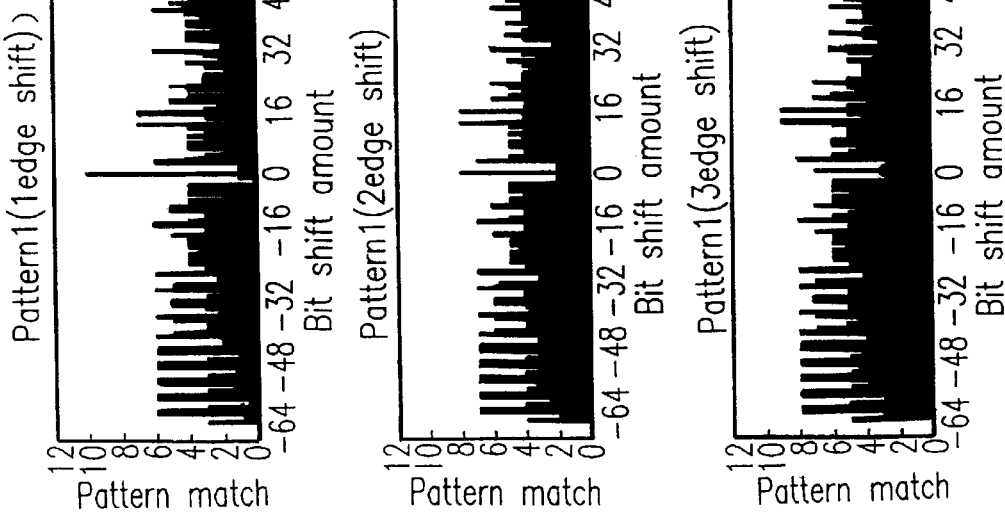
Figure 21:
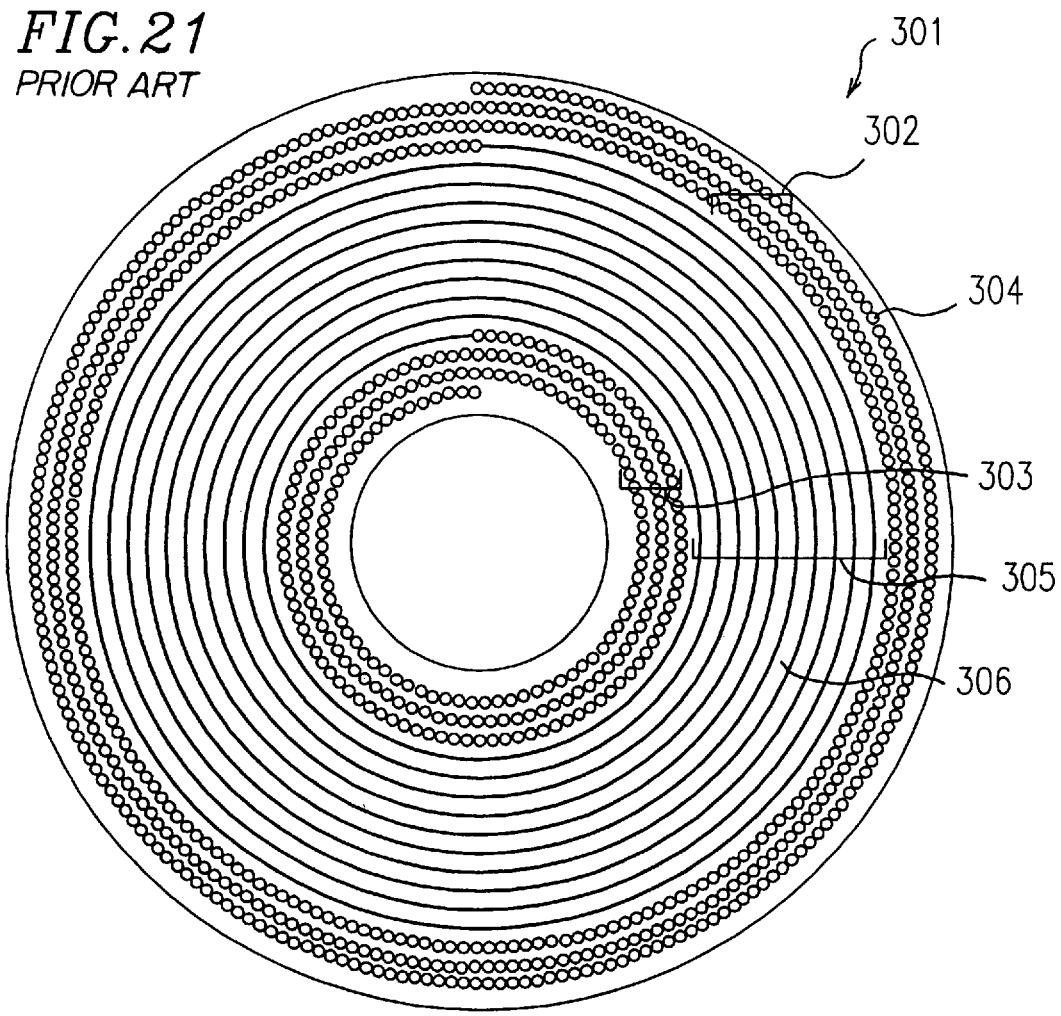
FIG. 21 illustrates a conventional optical disk.
Figure 22:
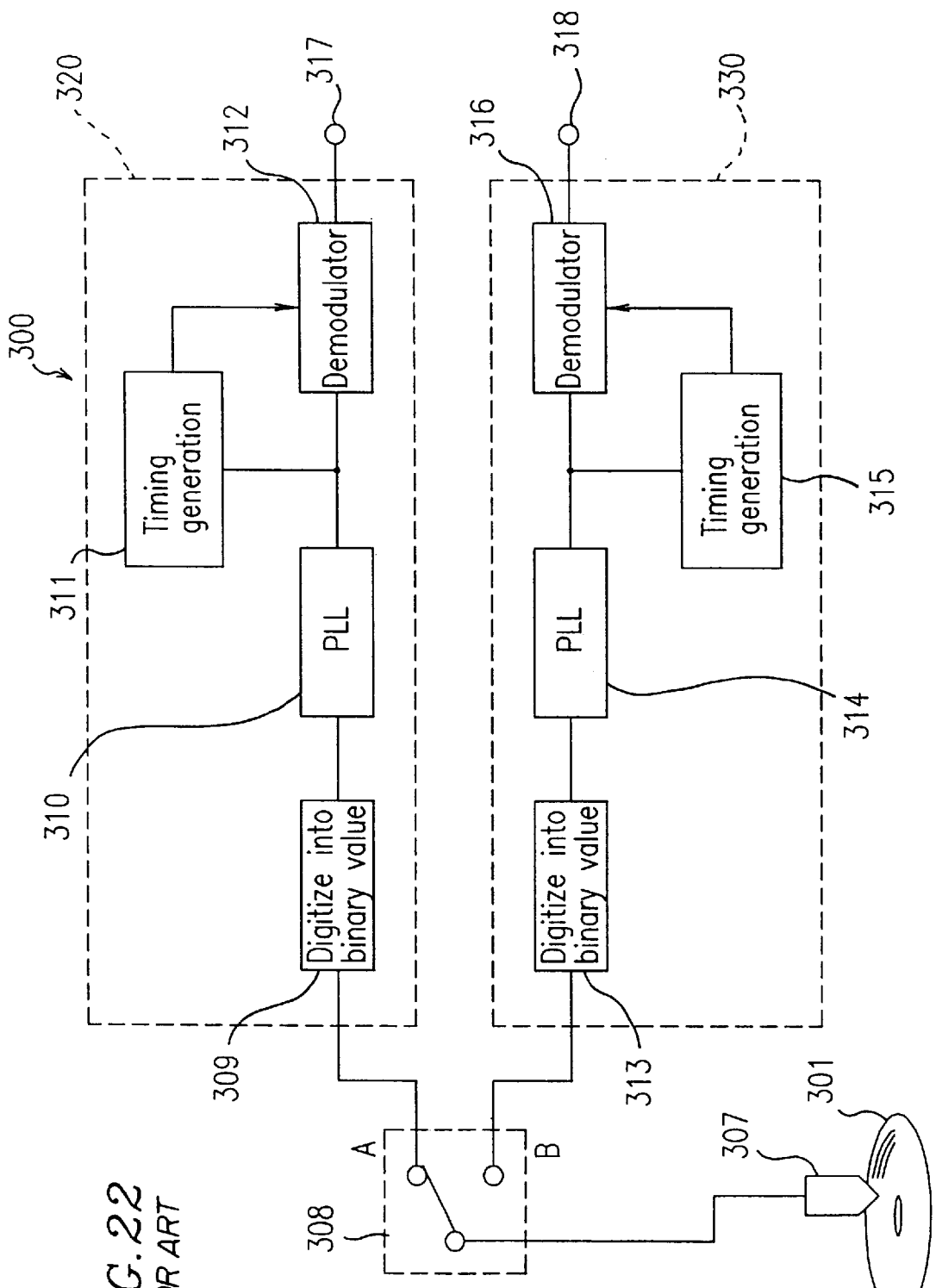
FIG. 22 is a block diagram illustrating a reproduction signal processing circuit for reproducing data from the conventional optical disk.

FIGS. 20A and 20B show the results of the worst values of pattern matches when 1-bit edge shift occurs at any one to three positions within the range of the detection window 97 for detecting the second data synchronous series. FIG. 20C shows the results of the pattern matches obtained when, due to the rise of slice level, the pattern of the VFO region 15 changes from original "10001000" to shifted "10010000" and the second data synchronous series of the PSY region 44 is also subjected to a similar change. Likewise, FIG. 20D shows the results of the pattern matches obtained when the slice level falls.

As shown in FIGS. 20A and 20B, as the number of edge shifts increases by one, the number of pattern matches increases by one at almost all the bit positions as a whole. As a result, as is observed from FIG. 20A, in the case of pattern 1, when the edge shift occurs at two positions, the number of pattern matches becomes 8 even at positions outside the reference position of the detection window 97. This may cause miss-detection. In the case of pattern 4, however, the number of pattern matches is 6 at maximum at positions outside the reference position of the detection window 97 even when the edge shift occurs at two positions. The probability of miss-detection is therefore small.

As is observed from FIG. 20C, in the case of pattern 1, when the detection window 97 is shifted leftward (toward the negative bit shift amount) from the reference position by 64 to 48 bits for detection, i.e., when pattern match is performed with the signal series of the VFO region 15 with the slice level variation, there exists a position where the number of pattern matches abruptly increases to as high as 8. This will be mistakenly detected as the second data synchronous series. In the case of pattern 4, however, the number of pattern matches is 5 at maximum at positions leftward the reference position of the detection window 97 even when the slice level varies. The possibility of miss-detection is therefore small.

Thus, pattern 4 is preferable as the second synchronous series to be recorded on the PYS region because it has good properties as the recording code and has a smaller possibility of miss-detection of a synchronous signal due to an edge shift or a variation of the slice level.

Thus, according to the optical disk of the present invention, the sector identification data of the first header region is reproduced when either of the groove track and the land track is traced. This eliminates the necessity of providing an exclusive header region for each of the groove track and the land track.

Regarding the preformat of the rewritable area, the first header region can be formed on the optical disk easily with high precision by wobbling a light beam for cutting and forming guide grooves (groove tracks) outward and inward from the center line of the groove tracks. This eliminates the necessity of providing an additional exclusive light source for forming the header region in the rewritable area.

Thus, according to the optical disk of the present invention, the preformat of the rewritable area can be easily formed with high precision using one light source for cutting. This makes it possible to form the preformat using a conventional cutting machine when both the rewritable area and the read-only area are formed on one optical disk.

According to the present invention, the sector length, the length of the header region, and the length of the data region in the read-only area are made equal to those in the rewritable area. As a result, the data format of the read-only area matches the data format of the rewritable area. This makes it possible to unify the sector managements of the read-only area and the rewritable area so as to unify the signal processing such as sector retrieval.

According to the present invention, there are provided the dummy data regions preceding and following the information data region in the read-only area. With this arrangement, the sector length, the length of the header region, and the length of data to be recorded on the sector in the read-only area can be made substantially equal to those in the rewritable area. This makes it possible to unify the sector managements of the read-only area and the rewritable area so as to unify the signal processing such as sector retrieval.

According to the optical disk of the present invention, separate reproduction signal processing circuits for the rewritable area and the read-only area are not necessary but one reproduction signal processing circuit can be shared when the rewritable area and the read-only area are formed on one optical disk. This makes it possible to reduce the circuit size of an optical disk recording/reproducing apparatus. Thus, a read-only signal processing circuit with a simpler circuit configuration and higher reliability can be realized.

According to the present invention, the tracking error signal can be stably detected even when the phase error detection method is employed for servo tracking, allowing relatively stable servo tracking. Also, by using different data synchronous series for the second dummy data regions on adjacent tracks, the servo tracking can be stabilized and the start of the information data region can be detected without fail.

According to the present invention, a sector in the read-only area left with no data recorded thereon is filled with dummy data. With this filling, the rewritable area can always start from the head of a track, and thus effective sector management is realized.

According to the present invention, the second data synchronous series with high autocorrelation is used for the presync region. This makes it possible to detect the presync region with high reliability. As a result, the position of the start of the data region following the presync region can be precisely specified. This makes it possible to stably reproduce recorded data.

The average of the mark/space lengths of the second data synchronous series is made longer than that of the VFO region. This makes it difficult for the second data synchronous series to match the pattern of the data synchronous series used for the VFO region. This is effective even in the case where no error arises in the reproduction signal or in the case where an edge shift occurs or the slice level varies. Accordingly, such a second data synchronous series used for the presync region is resistive to errors and provides excellent detection results.

By setting the digital summing value of the second data synchronous series at substantially zero, the DC component does not vary, and thus the stability of the reproduction signal is not degraded due to the addition of the second data synchronous series.

The second data synchronous series, which satisfies the limit value under the modulation code rule, prevents troubles such as waveform interference due to the recording marks recorded on the optical disk being too small and troubles such as unstable clock synchronization due to the inversion interval of the signal being too long resulting from the recording mark being too large.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical disk having a rewritable first recording area and a read-only second recording area, wherein the first recording area includes first tracks composed of groove tracks consisting of grooves and land tracks consisting of spaces between adjacent grooves, the groove tracks and the land tracks being formed on an optical disk substrate alternately in a spiral or concentric shape, each of the first tracks being divided into a plurality of first sector, each of the first sectors including a first header region having identification data for identifying the first sector and a first data region for recording user data by forming recording marks by changing optical characteristics of a recording layer, the second recording area includes second tracks formed with physical bit rows arranged on the optical disk substrate in a spiral or concentric shape, each of the second tracks being divided into a plurality of second sectors, each of the second sectors including a second header region having identification data for identifying the second sector and a second data region having read-only data recorded as the bit rows, the first header region includes a physical first pit row, each pit of the first pit row having a width in a radial direction of the optical disk substantially equal to a width of the groove track and being wobbled outward or inward from a center line of the groove track by about a quarter of a pitch of the groove track, and the second header region included a physical second pit row, each pit of the second pit row having a width in the radial direction of the optical disk smaller than the width of the groove track and being formed substantially along the center line of a respective one of the second tracks.

2. An optical disk according to claim 1, wherein a data sequence of the first header region is modulated with a header region modulation code and a data sequence of the second header region is modulated with the header region modulation code, and a data sequence of the first data region is modulated with a data region modulation code and a data sequence of the second data region is modulated with the data region modulation code.

3. An optical disk according to claim 1, wherein the identification data of the first header region has a header region data format with a header region data sequence and a header region data capacity, and the identification data of the second header region has a header region data format with the header region data sequence and the header region data capacity, and the first data region has a first data region format having a data region data sequence and a data region data capacity, and the second data region has a data region data format with the data region data sequence and the data region data capacity.

4. An optical disk according to claim 3, wherein a data bit interval between the first header region and the first data region in the first recording area is substantially equal to a data bit interval between the second header region and the second data region in the second recording area.

5. An optical disk according to claim 3, wherein, in the first recording area, each of the first sectors includes a mirror mark region, a gap region, and a first dummy data region which are formed between the first header region and the first data region and a guard data region and a buffer region which are formed between the first data region and a first header region of a next first sector, and in the second recording area, each of the second sectors includes a second dummy data region formed between the second header region and the second data region and a third dummy data region formed between the second data region and a second header region of a next second sector.

6. An optical disk according to claim 5, wherein each of the first dummy data region, the second dummy data region, and the third dummy date region have a predefined sequence pattern of a modulation code used for modulation of data to be recorded.

7. An optical disk having a rewritable first recording area and a read-only second recording area, wherein the first recording area includes first tracks composed of groove tracks consisting of grooves and land tracks consisting of spaces between adjacent grooves, the groove tracks and the land tracks being formed on an optical disk substrate alternately in a spiral or concentric shape, each of the first tracks being divided into a plurality of first sectors, each of the first sectors including a first header region having identification data for identifying the first sector and a first data region for recording user data as recording marks by changing optical characteristics of a recording layer, the second recording area includes second tracks formed with physical bit rows arranged on the optical disk substrate in a spiral or concentric shape, each of the second tracks being divided into a plurality of second sectors, each of the second sectors including a second header region having identification data for identifying the second sector and a second data region having read-only data recorded as the bit rows, a data series of the first recording area being modulated with a modulation code and a data series of the second recording area being modulated with the modulation code, the first sector having a sector data capacity and the second sector having the sector data capacity, the first header region having a header region data sequence and the second header region having the header region data sequence, and the first data region having a data region data sequence and a data region data capacity, and the second data region having the data region data sequence and the data region data capacity.

8. An optical disk according to claim 7, wherein each of the first sectors includes a first dummy data region formed between the first header region and the first date region, each of the second sectors includes a second dummy data region formed between the second header region and the second data region and a third dummy data region formed between the second data region and a second header region of a next second sector, and each of the second and third dummy data regions includes, in at least a portion thereof, data of a data series different from a data series of a corresponding dummy data region on an inward or outward adjacent track on the optical disk substrate.

9. An optical disk according to claim 8, wherein each of the second and third dummy data regions includes, in at least a portion thereof, a random data series with substantially no correlation with a data series provided on a corresponding dummy data region on an adjacent track.

10. An optical disk according to claim 9, wherein the random data series is a data series generated by an M-series sequence.

11. An optical disk according to claim 8, wherein each of the second and third dummy data regions includes, in at least a portion thereof, a random data series with substantially no correlation with a date series formed on a corresponding dummy data region on an adjacent track and a predefined sequence pattern included in a modulation code provided following the random data series.

12. An optical disk according to claim 8, wherein each of the second and third dummy data Legions includes, in at least a portion thereof, a data synchronous series for specifying a start timing position of the second data region.

13. An optical disk according to claim 12, wherein the data synchronous series included in the second and third dummy data regions are provided so that a pattern of the data synchronous series is switched every track among a plurality of different data synchronous patterns.

14. An optical disk according to claim 8, wherein each of the second and third dummy data regions has in at least a portion thereof a pattern generated by scrambling a predetermined data based on address information in the sector identification data and by modulating the scrambled data with the modulation code.

15. An optical disk according to claim 7, wherein one error correction block includes a predetermined number k (k is an integer) of the first or second sectors, and data is recorded on the number of sectors equal to a multiple of k, dummy data being recorded on remaining sectors of less than k.

16. An optical disk having a rewritable first recording area and a read-only second recording area, wherein the first recording area includes first tracks composed of groove tracks consisting of grooves and land tracks consisting of spaces between adjacent grooves, the groove tracks and the land tracks being formed on an optical disk substrate alternately in a spiral or concentric shape, each of the first tracks being divided into a plurality of first sectors, each of the first sectors including a first header region having identification data for identifying the first sector and a first data region for recording user data by forming recording marks obtained by changing optical characteristics of a recording layer, the second recording area includes second tracks formed with physical bit rows arranged on the optical disk substrate in a spiral or concentric shape, each of the second tracks being divided into a plurality of second sectors, each of the second sectors including a second header region having identification data for identifying the second sector and a second data region having read-only data recorded as the bit rows, at least one of the first and second data regions comprises:

a first data synchronous series provided at a head of the at least one of the first and second data regions for specifying a start timing position of the at least one of the first and second data regions;

a second data synchronous series preceding the first data synchronous series for specifying a start timing position of the at least one of the first and second data regions; and a third data synchronous series preceding the second data synchronous series and having a predefined repetition sequence pattern of a modulation code in the data region.

17. An optical disk according to claim 16, wherein the data region is divided into a plurality of data blocks, the first data synchronous series is provided at a head of each of the data blocks, and the second data synchronous series precedes the first data synchronous series provided at a head of a first one of the plurality of data blocks.

18. An optical disk according to claim 16, wherein a digital summing value which is obtained by converting "1" and "0" in the second data synchronous series into "1" and "−1", respectively, and by summing all values is substantially zero.

19. An optical disk according to claim 16, wherein the second data synchronous series satisfies a maximum length and a minimum length as limit values under a modulation code rule of a mark length ("1" or "0" level) and a space length ("0" or "1" level) of the date region.

20. An optical disk according to claim 16, wherein an average of the mark length and the space length of the second data synchronous series in larger than the mark length and the space length of the third data synchronous series.

21. An optical disk according to claim 16, wherein the second date synchronous series is a date series composed of a combination of a plurality of any of 4-bit code symbols, "0100", "0010", "1000", "0000".

22. An optical disk according to claim 16, wherein the second data synchronous series is a data series including a code series, "0000 0100 0100 1000 0010 0001 0010 0000 1000 0010 0001 0000".

* * * * *